(12) United States Patent
Yang et al.

(10) Patent No.: US 11,812,164 B2
(45) Date of Patent: Nov. 7, 2023

(54) PIXEL-INTERPOLATION BASED IMAGE ACQUISITION METHOD, CAMERA ASSEMBLY, AND MOBILE TERMINAL

(71) Applicant: GUANGDONG OPPO MOBILE TELECOMMUNICATIONS CORP., LTD., Guangdong (CN)

(72) Inventors: Xin Yang, Guangdong (CN); Xiaotao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/148,198

(22) Filed: Dec. 29, 2022

(65) Prior Publication Data

US 2023/0138657 A1    May 4, 2023

Related U.S. Application Data

(63) Continuation of application No. PCT/CN2021/088714, filed on Apr. 21, 2021.

(30) Foreign Application Priority Data

Jul. 8, 2020 (CN) .......................... 202010651195.1

(51) Int. Cl.
*H04N 23/84* (2023.01)
*H04N 5/265* (2006.01)

(52) U.S. Cl.
CPC ........... *H04N 23/843* (2023.01); *H04N 5/265* (2013.01)

(58) Field of Classification Search
CPC .... H04N 23/843; H04N 5/265; H04N 25/133; H04N 19/132; H04N 9/64; H04N 23/80; H04N 23/84; G06T 3/4015
See application file for complete search history.

(56) References Cited

U.S. PATENT DOCUMENTS

| 2009/0251575 A1 | 10/2009 | Wada |
| 2017/0061576 A1 | 3/2017 | Lim et al. |
| 2017/0257605 A1* | 9/2017 | Iwakura ................. H04N 25/76 |

FOREIGN PATENT DOCUMENTS

| CN | 101233763 A | 7/2008 |
| CN | 101652798 A | 2/2010 |

(Continued)

OTHER PUBLICATIONS

WIPO, International Search Report for PCT Application No. PCT/CN2021/088714, dated Jul. 9, 2021.

(Continued)

*Primary Examiner* — Mekonnen D Dagnew
(74) *Attorney, Agent, or Firm* — Hodgson Russ LLP

(57) ABSTRACT

An image acquisition method includes: exposing a pixel array to obtain a first color original image and a second color original image, data of the first color original image being generated by at least one color photosensitive pixel in a sub-unit, and data of the second color original image being generated by at least one transparent photosensitive pixel and the at least one color photosensitive pixel in the sub-unit; performing interpolation on the first color original image to obtain first interpolated images of multiple color channels, and performing interpolation on the second color original image to obtain a second interpolated image of at least one color channel; fusing the second interpolated image with the first interpolated images to obtain fused images of the multiple color channels; and acquiring a target image according to the fused image of the multiple color channels.

20 Claims, 17 Drawing Sheets

(56) References Cited

FOREIGN PATENT DOCUMENTS

| | | |
|---|---|---|
| CN | 101939978 A | 1/2011 |
| CN | 102006484 A | 4/2011 |
| CN | 103765876 A | 4/2014 |
| CN | 106878605 A | 6/2017 |
| CN | 111050041 A | 4/2020 |
| CN | 111314592 A | 6/2020 |
| CN | 111385543 A | 7/2020 |
| CN | 111711755 A | 9/2020 |
| WO | 2013150706 A1 | 10/2013 |

OTHER PUBLICATIONS

CNIPA, First Office Action for CN Application No. 202010651195.1, dated Apr. 12, 2021.
CNIPA, Office Action for CN Application No. 202010651195.1, dated Aug. 25, 2021.

* cited by examiner

PIXEL-INTERPOLATION BASED IMAGE ACQUISITION METHOD, CAMERA ASSEMBLY, AND MOBILE TERMINAL

CROSS-REFERENCE TO RELATED APPLICATIONS

This application is a continuation of International Application No. PCT/CN2021/088714, filed Apr. 21, 2021, which claims priority to Chinese Patent Application No. 202010651195.1, filed Jul. 8, 2020, the entire disclosures of which are incorporated herein by reference.

TECHNICAL FIELD

The disclosure relates to the field of imaging technologies, and more particularly to an image acquisition method, a camera assembly, and a mobile terminal.

BACKGROUND

A camera may be installed in an electronic device such as a mobile phone, enabling the electronic device with an image acquisition function. The camera may be provided with a color filter array therein to acquire a color image. At present, the color filter array in the camera is usually in a form of a Bayer array. Each color filter in a Bayer color filter array allows only single-color light to pass through, so that most of the light will be filtered out, affecting the quality of the image acquired by the camera.

SUMMARY

Embodiments of the disclosure provide an image acquisition method, a camera assembly, and a mobile terminal.

According to the embodiments of the disclosure, the image acquisition method is performed by an image sensor. The image sensor includes a pixel array including multiple sub-units, each of the multiple sub-units includes at least one transparent photosensitive pixel and at least one color photosensitive pixel, and the color photosensitive pixel has a narrower spectral response range than the transparent photosensitive pixel. The image acquisition method includes: acquiring a first color original image and a second color original image by exposing the pixel array, the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel and the at least one color photosensitive pixel of the sub-unit; and acquiring a target image based on the fused images of the multiple color channels; performing, for each of multiple color channels, interpolation on the first color original image to acquire a first interpolated image of the color channel, and performing interpolation on the second color original image to acquire a second interpolated image of at least one color channel; fusing the second interpolated image of the at least one color channel with the first interpolated images of the multiple color channels to obtain fused images of the multiple color channels; and acquiring a target image based on the fused images of the multiple color channels.

According to the embodiments of the disclosure, the camera assembly includes an image sensor and a processor. The image sensor includes a pixel array including multiple sub-units, each of the multiple sub-units includes at least one transparent photosensitive pixel and at least one color photosensitive pixel, and the color photosensitive pixel has a narrower spectral response band than the transparent photosensitive pixel, and the pixel array is exposed to acquire a first color original image and a second color original image are acquired, where the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel and the at least one color photosensitive pixel of the sub-unit; The processor is configured to perform, for each of multiple color channels, interpolation on the first color original image to acquire a first interpolated image of the color channel, and perform interpolation on the second color original image to acquire a second interpolated image of at least one color channel; fuse, for each of the multiple color channels, the second interpolated image with the first interpolated image of the color channel to obtain a fused image of the color channel; and acquire a target image based on the fused images of the multiple color channels.

According to the embodiments of the disclosure, the mobile terminal includes a housing and a camera assembly. The camera assembly is combined with the housing. The camera assembly includes an image sensor and a processor. The image sensor includes a pixel array including multiple sub-units, each of the multiple sub-units includes at least one transparent photosensitive pixel and at least one color photosensitive pixel, and the color photosensitive pixel has a narrower spectral response range than the transparent photosensitive pixel. A first color original image and a second color original image are acquired by exposing the pixel array, where the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel and the at least one color photosensitive pixel of the sub-unit. The processor is configured to perform interpolation on the first color original image to acquire first interpolated images of multiple color channels, and perform interpolation on the second color original image to acquire at least one second interpolated image of the multiple color channels; fuse the at least one second interpolated image with the first interpolated images of the multiple color channels to obtain fused images of the multiple color channels; and acquire a target image based on the fused images of the multiple color channels.

Additional aspects and advantages of the disclosure will be given in part in the following description, and become apparent in part from the following descriptions, or be learned from the practice of the disclosure.

BRIEF DESCRIPTION OF THE DRAWINGS

The above and/or additional aspects and advantages of the disclosure will become more apparent and easily understood from the following description of the embodiments in conjunction with the drawings, in which.

DETAILED DESCRIPTION

Figure 1:
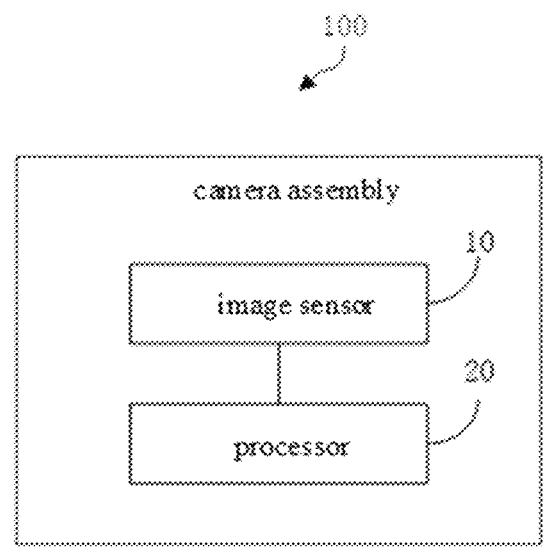
FIG. 1 is a schematic diagram illustrating a camera assembly according to some embodiments of the disclosure.

The embodiments of the disclosure will be described in detail below. The examples of the embodiments are shown in the drawings, where same or similar references indicate, throughout the drawings, same or similar elements or elements having same or similar functions. The embodiments described with reference to the drawings are exemplary and only used for explaining the disclosure, and should not be construed as limitations to the disclosure.

In the related art, the color filter array in the camera is usually in the form of a Bayer array. Each color filter in a Bayer color filter array allows only single-color light to pass through, so that most of the light will be filtered out, which affects a quality of the image acquired by the camera.

Figure 2:
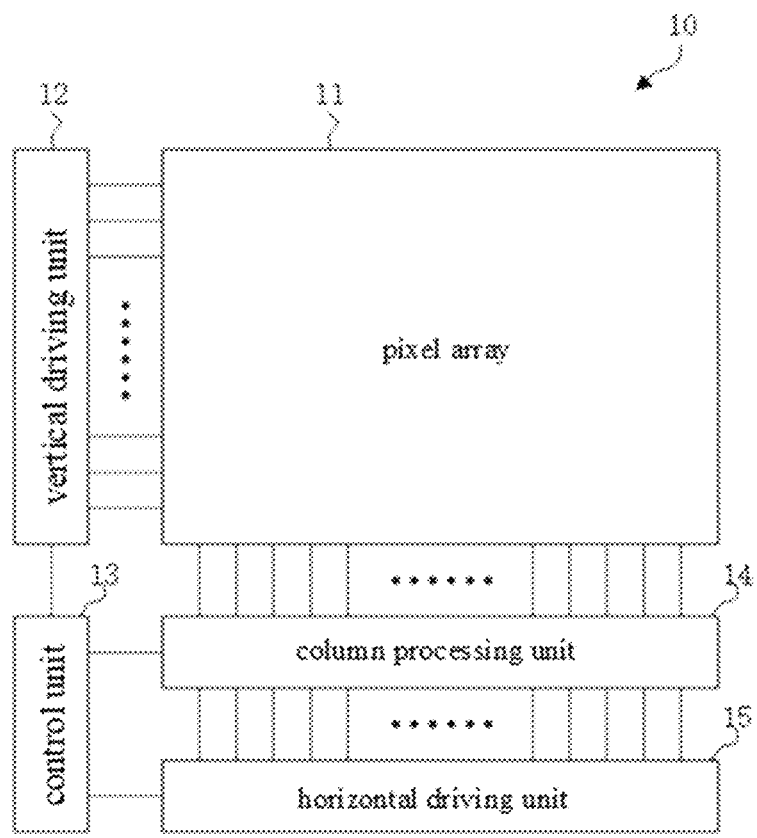
FIG. 2 is a schematic diagram illustrating a pixel array according to some embodiments of the disclosure.
Figure 5:
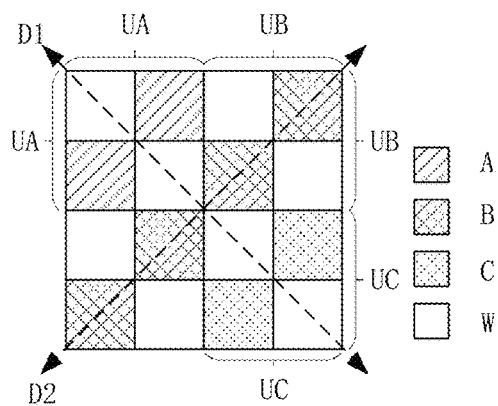
FIGS. 5 to 15 are schematic diagrams each illustrating a pixel arrangement of a minimum repeating unit in a pixel array according to some embodiment of the disclosure.

For the above reasons, referring to FIGS. 1, 2 and 5, the disclosure provides a camera assembly 100. The camera assembly 100 includes an image sensor 10 and a processor 20. The image sensor 10 includes a pixel array 11, the pixel array 11 includes multiple sub-units, each sub-unit includes at least one transparent photosensitive pixel W and at least one color photosensitive pixel, and the color photosensitive pixel has a narrower spectral response range than the transparent photosensitive pixel W. The pixel array 11 is exposed to acquire a first color original image and a second color original image, the first color original image is composed of multiple pieces of first color original image data, each piece of the first color original image data is generated by the at least one color photosensitive pixel of the sub-unit, the second color original image is composed of multiple pieces of second color original image data, and each piece of the second color original image data is generated by the at least one transparent photosensitive pixel W and the at least one color photosensitive pixel of the sub-unit. The processor 20 is electrically connected to the image sensor 10. The processor 20 is configured to perform, for each of multiple color channels, interpolation on the first color original image to acquire a first interpolated image of the color channel, and perform interpolation on the second color original image to acquire a second interpolated image of at least one color channel; fuse, for each of the multiple color channels, the second interpolated image with the first interpolated image of the color channel to obtain a fused image of the color channel; and acquire a target image based on the fused images of the multiple color channels.

The camera assembly 100 according to the embodiments of the disclosure acquires, by exposing the pixel array 11, the first color original image including image data of only monochromatic color channel and the second color original image including image data of both the monochromatic color channel and panchromatic color channel, performs the interpolation on the first color original image to acquire first interpolated images of multiple color channels, performs the interpolation on the second color original image to acquire the second interpolated image of at least one color channel, and fuses the first interpolated image and the second interpolated image to improve the signal-to-noise ratio and the definition of the image so that the quality of the image taken in the dark environment can be improved.

The camera assembly 100 according to the embodiments of the disclosure will be described in detail below with reference to the drawings.

Referring to FIG. 2, the image sensor 10 includes a pixel array 11, a vertical driving unit 12 a control unit 13, a column processing unit 14 and a horizontal driving unit 15.

For example, the image sensor 10 may be adopted with a complementary metal oxide semiconductor (CMOS) photosensitive element or a charge-coupled device (CCD) photosensitive element.

Figure 3:
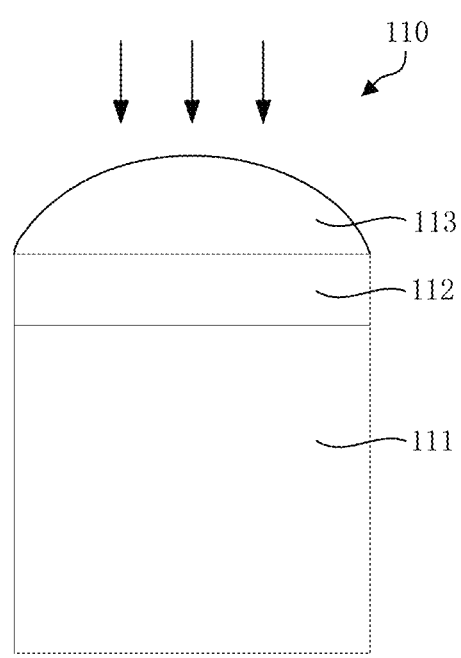
FIG. 3 is a schematic diagram illustrating a cross-sectional view of a photosensitive pixel according to some embodiments of the disclosure.
Figure 4:
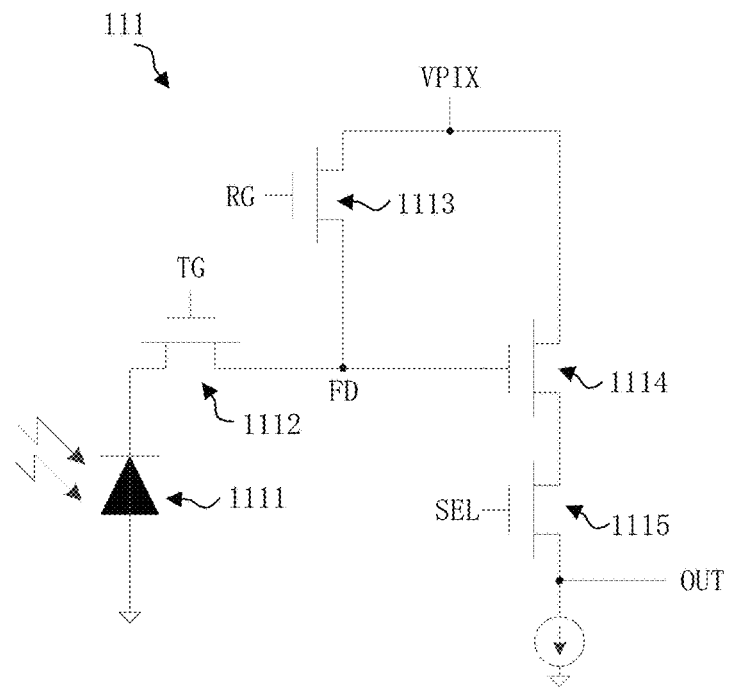
FIG. 4 is a schematic diagram illustrating a pixel circuit of the photosensitive pixel according to some embodiments of the disclosure.

For example, the pixel array may include multiple photosensitive pixels 110 (as illustrated in FIG. 3) arranged in a two-dimensional array (i.e. arranged in a two-dimensional matrix form), and each photosensitive pixel 110 includes a photoelectric conversion element 1111 (illustrated in FIG. 4). Each photosensitive pixel 110 converts light into electric charge according to an intensity of incident light.

For example, the vertical driving unit 12 includes a shift register and an address decoder. The vertical driving unit 12 includes a readout scanning function and a reset scanning function. The readout scanning function refers to sequentially scanning unit photosensitive pixels 110 row by row, and reading signals from these unit photosensitive pixels 110 row by row. For example, a signal output by each photosensitive pixel 101 in the selected and scanned photosensitive pixel row is transmitted to the column processing unit 14. The reset scanning function is configured to reset the electric charge, and a photo-electron of the photoelectric conversion element 1111 is discarded, such that the accumulation of new photo-electron may be started.

For example, the signal processing performed by the column processing unit 14 is correlated double sampling (CDS) processing. In the CDS process, a reset level and a signal level output by each photosensitive pixel 110 in the selected photosensitive pixel row are taken out, and a level difference is calculated. In this way, the signals of the photosensitive pixels 110 in a row are obtained. The column processing unit 14 may have an analog-to-digital (A/D) conversion function for converting an analog pixel signal into a digital format.

For example, the horizontal driving unit 15 includes a shift register and an address decoder. The horizontal driving unit 15 may sequentially scan the two-dimensional pixel array 11 column by column. Through the selection scanning operation performed by the horizontal driving unit 15, each photosensitive pixel column is sequentially processed and output by the column processing unit 14.

For example, the control unit 13 may configure timing signals according to an operation mode, and utilize multiple types of timing signals to control the vertical driving unit 12, the column processing unit 14, and the horizontal driving unit 15 to work together.

Referring to FIG. 3, the photosensitive pixel 110 includes a pixel circuit 111, a filter 112, and a microlens 113. The microlens 113, the filter 112, and the pixel circuit 111 are arranged in sequence along the light-receiving direction of the photosensitive pixel 110. The microlens 113 is configured to condense light, and the filter 112 is configured to pass light of a certain wavelength band and filter out the light of other wavelength bands. The pixel circuit 111 is configured to convert the received light into electrical signals, and provide the generated electrical signals to the column processing unit 14 illustrated in FIG. 2.

Referring to FIG. 4, the pixel circuit 111 may be applied to each photosensitive pixel 110 (as illustrated in FIG. 3) in the pixel array 11 as illustrated in FIG. 2. The working principle of the pixel circuit 111 will be described below with reference to FIGS. 2 to 4

As illustrated in FIG. 4, the pixel circuit 111 includes a photoelectric conversion element 1111 (e.g., a photodiode), an exposure control circuit (e.g., a transfer transistor 1112), a reset circuit (e.g., reset transistor 1113), an amplifier circuit (e.g., an amplifier transistor 114), and a selection circuit (e.g., a selection transistor 115). In the embodiments of the disclosure, the transfer transistor 1112, the reset transistor 1113, the amplifier transistor 1114, and the selection transistor 1115 are, for example, MOS transistors, but are not limited thereto.

For example, the photoelectric conversion element 1111 includes a photodiode, and the anode of the photodiode may be connected to the ground. The photodiode converts the received light into an electric charge. The cathode of the photodiode is connected to a floating diffusion unit FD through the exposure control circuit (for example, the transfer transistor 1112). The FD is connected to the gate of the amplifier transistor 1114 and the source of the reset transistor 1113.

For example, the exposure control circuit is the transfer transistor 1112, and the control terminal TG of the exposure control circuit is the gate of the transfer transistor 1112. When a pulse of an active level (for example, a VPIX level) is transmitted to the gate of the transfer transistor 1112 through an exposure control line, the transfer transistor 1112 is turned on. The transfer transistor 1112 transfers the photoconverted charge from the photodiode to the floating diffusion unit FD.

For example, the drain of the reset transistor 1113 is connected to the pixel power supply (VPIX). The source of the reset transistor 113 is connected to the floating diffusion unit FD. Before the charge is transferred from the photodiode to the floating diffusion unit FD, the pulse of the effective reset level is transmitted to the gate of the reset transistor 113 through a reset line, and the reset transistor 113 is turned on. The reset transistor 113 resets the floating diffusion unit FD to the pixel power supply VPIX.

For example, the gate of the amplifier transistor 1114 is connected to the floating diffusion unit FD. The drain of the amplifier transistor 1114 is connected to the pixel power supply VPIX. After the floating diffusion unit FD is reset by the reset transistor 1113, the amplifier transistor 1114 outputs a reset level through an output terminal OUT through the selection transistor 1115. After the charge of the photodiode is transferred by the transfer transistor 1112, the amplifier transistor 1114 outputs a signal level through the output terminal OUT of the selection transistor 1115.

For example, the drain of the selection transistor 1115 is connected to the source of the amplifier transistor 1114. The source of the selection transistor 1115 is connected to the column processing unit 114 in FIG. 2 through the output terminal OUT. When the pulse of the active level is transmitted to the gate of the selection transistor 1115 through the selection line, the selection transistor 1115 is turned on. The signal output by the amplifier transistor 1114 is transmitted to the column processing unit 14 through the selection transistor 1115.

It should be noted that the pixel structure of the pixel circuit 111 in the embodiments of the disclosure is not limited to the structure shown in FIG. 4. For example, the pixel circuit 111 may have a three-transistor pixel structure, in which the functions of the amplifier transistor 1114 and the selection transistor 1115 are performed by a transistor. For example, the exposure control circuit is not limited to a single transfer transistor 1112, and other electronic elements or structures with the function of controlling the conduction of the control terminal may also be implemented as the exposure control circuit in the embodiments of the disclosure. The single transfer transistor 112 according to the embodiments of the disclosure is simple to implement, low cost, and easy to control.

Referring to FIGS. 5 to 15, schematic diagrams of the arrangement of the photosensitive pixels 110 (shown in FIG. 3) in the pixel array 11 (shown in FIG. 2) according to some embodiments of the disclosure are illustrated. The photosensitive pixels 110 include two types, one is a transparent photosensitive pixel W, and the other is a color photosensitive pixel. The pixel array 11 includes multiple minimum repeating units, and each minimum repeating unit includes multiple subunits. FIGS. 5 to 15 only illustrate the arrangements of multiple photosensitive pixels 110 in one minimum repeating unit composed of four subunits. In other examples, the quantity of the subunits in each minimum repeating unit may also be two, three, five, ten, etc., which is not limited to these examples. The pixel array 11 may be formed by duplicating the minimum repeating unit composed of the four subunits, which is illustrated in FIGS. 5 to 17, multiple times on the rows and columns. Each subunit includes at least one transparent photosensitive pixel and at least one color photosensitive pixel. Specifically, in each sub-unit, the transparent photosensitive pixels W and the color photosensitive pixels may be alternately arranged. In at least one alternative embodiment, in each sub-unit, multiple photosensitive pixels 110 in the same row may have the same color channel. In at least one alternative embodiment, in each sub-unit, multiple photosensitive pixels 110 in the same column may have the same color channel. In at least one alternative embodiment, in each minimum repeating unit, multiple photosensitive pixels 110 in the same row and with the same color channel and multiple photosensitive pixels 110 in the same column and with the same color may be arranged alternatively. In at least one alternative embodiment, in a case where there is one transparent photosensitive pixel and multiple color photosensitive pixels in each sub-unit, the transparent photosensitive pixel W may be located at any position in the sub-unit. In at least one alternative embodiment, in a case where there are multiple transparent photosensitive pixels and one color photosensitive pixel in each sub-unit, the color photosensitive pixel may be located at any position in the sub-unit.

Specifically, for example, FIG. 5 is a schematic diagram illustrating an arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| W | A | W | B |
|---|---|---|---|
| A | W | B | W |
| W | B | W | C |
| B | W | C | W | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 5, for each sub-unit, the transparent photosensitive pixel W and the color photosensitive pixel are arranged alternatively.

As illustrated in FIG. 5, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1 (for example, a direction connecting the upper left corner and the lower right corner in FIG. 5), and the two second type of sub-units UB are arranged in a second diagonal direction D2 (for example, a direction connecting the upper right corner and the lower left corner in FIG. 5). The first diagonal direction D1 is different from the second diagonal direction D2. For example, the first diagonal and the second diagonal are perpendicular.

It should be noted that, in some other embodiments, the first diagonal direction D1 may also refer to the direction connecting the upper right corner and the lower left corner, and the second diagonal direction D2 may also refer to the direction connecting the upper left corner and the lower right corner. In addition, the term "direction" used herein does not refer to a single direction, but may be understood as a concept of a "straight line", that is, the term "direction" has bidirectional directions between two ends of the straight line. The explanation of the first diagonal direction D1 and the second diagonal direction D2 in FIGS. 6 to 10 is the same as the explanation that given here.

Figure 6:
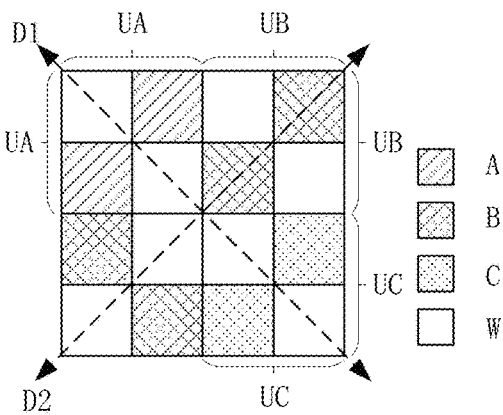

In another example, FIG. 6 is a schematic diagram illustrating another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| W | A | W | B |
|---|---|---|---|
| A | W | B | W |
| B | W | W | C |
| W | B | C | W | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

The arrangement of the photosensitive pixels 110 in the minimum repeating unit illustrated in FIG. 6 is almost the same as the arrangement of the photosensitive pixels 110 in the minimum repeating unit illustrated in FIG. 5. The difference is that the alternating sequence of the transparent photosensitive pixels W and the color photosensitive pixels in the second type of sub-unit UB located in the lower left corner in FIG. 6 is different from the alternating sequence of the transparent photosensitive pixels W and the color photosensitive pixels in the second type of sub-unit UB located in the lower left corner in FIG. 5. Specifically, in the second type of sub-unit UB located in the lower left corner in FIG. 5, the alternating order of the photosensitive pixels 110 in the first row is the transparent photosensitive pixel W and the color photosensitive pixel (i.e., the second color photosensitive pixel B); and the alternating order of the photosensitive pixels 110 in the second row is the color photosensitive pixel (i.e., the second color photosensitive pixel B) and the transparent photosensitive pixel W. In the second type of sub-unit UB located in the lower left corner in FIG. 6, the alternating order of the photosensitive pixels 110 in the first row is the color photosensitive pixel (i.e., the second color photosensitive pixel B) and the transparent photosensitive pixel W, and the alternating order of the photosensitive pixels 110 in the second row is the transparent photosensitive pixel W, the color photosensitive pixel (i.e., the second color photosensitive pixel B).

As illustrated in FIG. 6, the alternating orders of the transparent photosensitive pixels W and the color photosensitive pixels in the first type of sub-unit UA and the third type of sub-unit UC are different from the alternating order of the transparent photosensitive pixels W and the color photosensitive pixels in the second type of sub-unit UB located in the lower left corner. Specifically, in the first type of sub-unit UA and the third type of sub-unit UC illustrated in FIG. 6, the alternating order of the photosensitive pixels 110 in the first row is the transparent photosensitive pixel W and the color photosensitive pixel, and the alternating order of the photosensitive pixels 110 in the second row is the color photosensitive pixel and the transparent photosensitive pixel W. In the second type of sub-unit UB located at the lower left corner illustrated in FIG. 6, the alternating order of the photosensitive pixels 110 in the first row is the color photosensitive pixel (i.e., the second color photosensitive pixel B) and the transparent photosensitive pixel W, and the alternating order of the photosensitive pixels 110 in the second row is the transparent photosensitive pixel W and the color photosensitive pixel (i.e., the second color photosensitive pixel B).

Thus, as illustrated in FIGS. 5 and 6, in the minimum repeating unit, the alternating orders of the transparent photosensitive pixels W and the color photosensitive pixels in different sub-units may be the same (as illustrated in FIG. 5) or different (as illustrated in FIG. 6).

Figure 7:
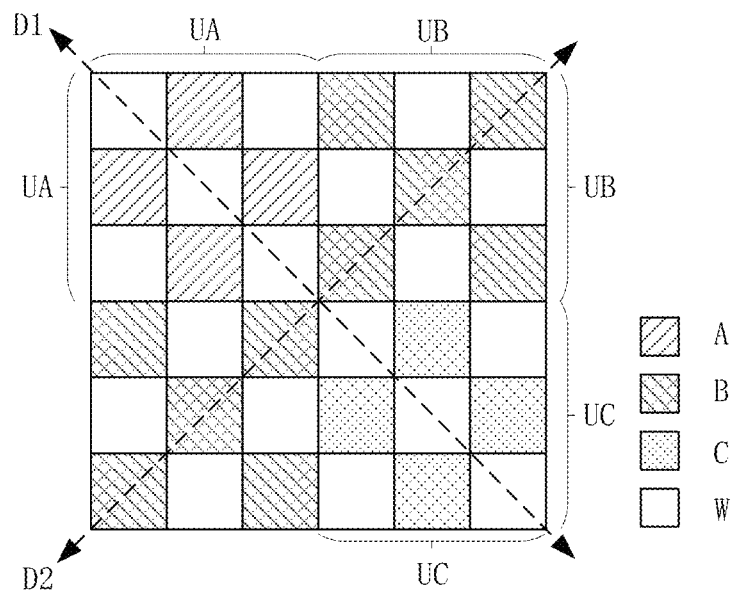

In another example, FIG. 7 is a schematic diagram illustrating still another arrangement of photosensitive pixels 110 (as illustrated in FIG. 3) in a minimum repeating unit in the pixel array according to some embodiment of the disclosure. The minimum repeating unit is composed of 36 photosensitive pixels 110 which are arranged in 6 rows and 6 columns, and each sub-unit is composed of 9 photosensitive pixels 110 arranged in 3 rows and 3 columns. The arrangement is:

| W | A | W | B | W | B |
| A | W | A | W | B | W |
| W | A | W | B | W | B |
| B | W | B | W | C | W |
| W | B | W | C | W | C |
| B | W | B | W | C | W | where W represents the transparent photosensitive pixel, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 7, for each sub-unit, the transparent photosensitive pixel W and the color photosensitive pixel are arranged alternatively.

As illustrated in FIG. 7, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 8:
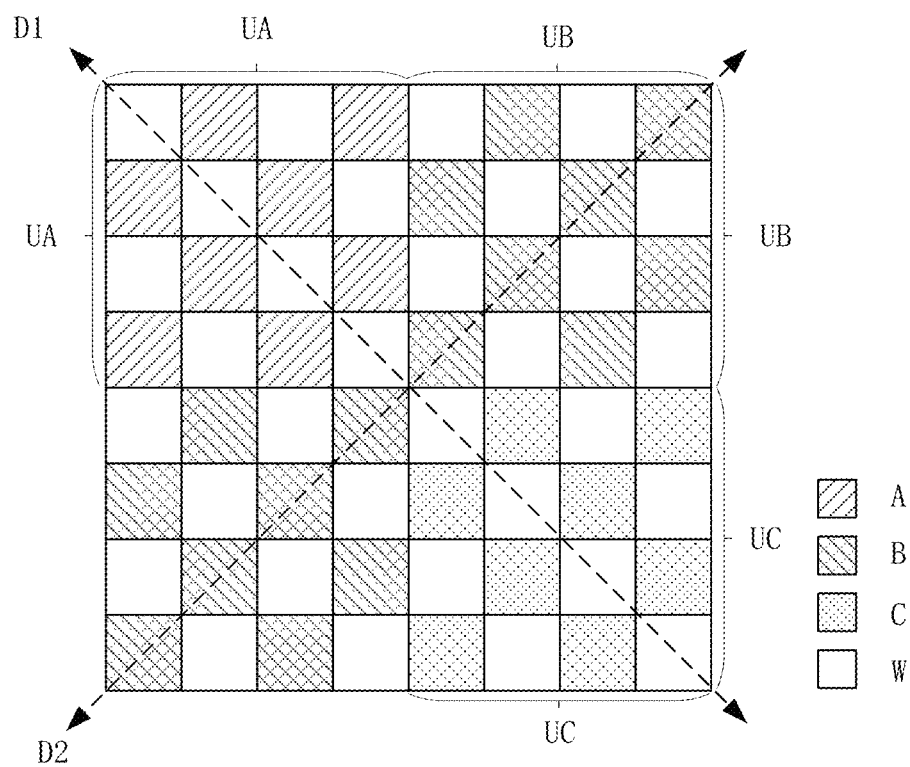

In yet another example, FIG. 8 is a schematic diagram illustrating yet another arrangement of photosensitive pixels 110 (as illustrated in FIG. 3) in a minimum repeating unit in the pixel array according to some embodiment of the disclosure. The minimum repeating unit is composed of 64 photosensitive pixels 110 which are arranged in 8 rows and 8 columns, and each sub-unit is composed of 16 photosensitive pixels 110 arranged in 4 rows and 4 columns. The arrangement is:

| W | A | W | A | W | B | W | B |
| A | W | A | W | B | W | B | W |
| W | A | W | A | W | B | W | B |
| A | W | A | W | B | W | B | W |
| A | W | A | W | B | W | B | W |
| B | W | B | W | C | W | C | W |
| W | B | W | B | W | C | W | C |
| B | W | B | W | C | W | C | W | where W represents the transparent photosensitive pixel, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 8, for each sub-unit, the transparent photosensitive pixel W and the color photosensitive pixel are arranged alternatively.

As illustrated in FIG. 8, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 9:
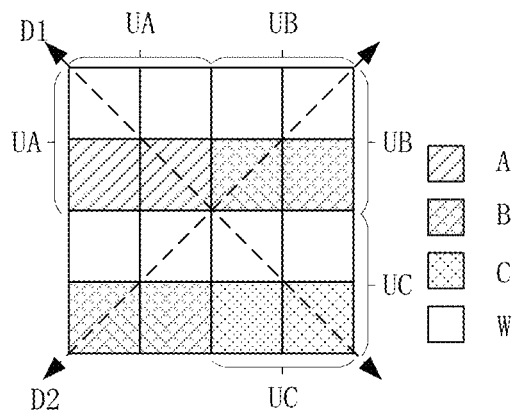

In still another example, FIG. 9 is a schematic diagram illustrating still yet another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| W | W | W | W |
| A | A | B | B |
| W | W | W | W |
| B | B | C | C | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 9, in each sub-unit, the photosensitive pixels 110 in the same row have the same color channel (that is, the photosensitive pixels 110 in the same row belong to the same type of photosensitive pixels 110. Specifically, the same type of photosensitive pixels 110 includes the following conditions: (1) all the photosensitive pixels 110 are the transparent photosensitive pixel W; (2) all the photosensitive pixels 110 are the first color photosensitive pixel A; (3) all the photosensitive pixels 110 are the second color photosensitive pixel B; (4) all the photosensitive pixels 110 are the third color photosensitive pixel C.

As illustrated in FIG. 9, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. The multiple photosensitive pixels 110 with the same color channel may be located either in the first row of the sub-unit or in the second row of the sub-unit, which are not limited herein. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 10:
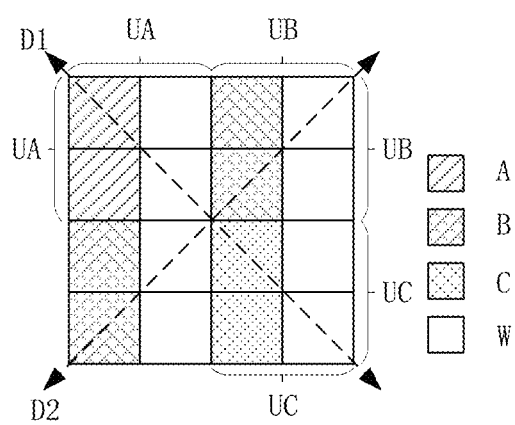

Specifically, in another example, FIG. 10 is a schematic diagram illustrating still yet another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| A | W | B | W |
|---|---|---|---|
| A | W | B | W |
| B | W | C | W |
| B | W | C | W | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 10, in each sub-unit, the multiple photosensitive pixels 110 located in the same column have the same color channel (i.e., the multiple photosensitive pixels 110 located in the same column belong to the same type of photosensitive pixel 110). Specifically, the same type of photosensitive pixels 110 includes the following conditions: (1) all the photosensitive pixels 110 are the transparent photosensitive pixel W; (2) all the photosensitive pixels 110 are the first color photosensitive pixel A; (3) all the photosensitive pixels 110 are the second color photosensitive pixel B; (4) all the photosensitive pixels 110 are the third color photosensitive pixel C.

As illustrated in FIG. 10, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. The multiple photosensitive pixels 110 with the same color channel may be located either in the first column of the sub-unit or in the second column of the sub-unit, which are not limited herein. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 11:
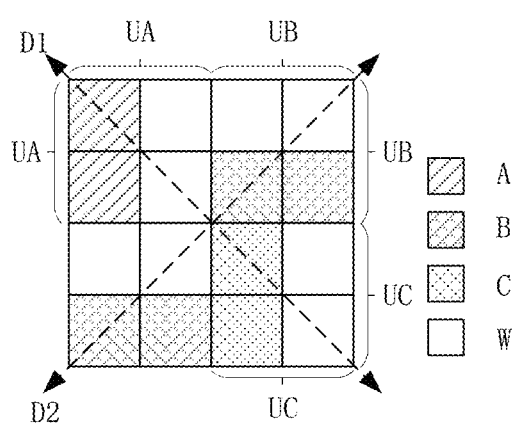

In still yet another example, FIG. 11 is a schematic diagram illustrating still yet another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| A | W | W | W |
|---|---|---|---|
| A | W | B | B |
| W | W | C | W |
| B | B | C | W | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 11, in each sub-unit, the photosensitive pixels 110 in the same row or the same column have the same color channel (that is, the photosensitive pixels 110 in the same row or in same column belong to the same type of photosensitive pixels 110. Specifically, the same type of photosensitive pixels 110 includes the following conditions: (1) all the photosensitive pixels 110 are the transparent photosensitive pixel W; (2) all the photosensitive pixels 110 are the first color photosensitive pixel A; (3) all the photosensitive pixels 110 are the second color photosensitive pixel B; (4) all the photosensitive pixels 110 are the third color photosensitive pixel C.

As illustrated in FIG. 11, there are three types of sub-units. Specifically, a first type of sub-unit UA includes multiple transparent photosensitive pixels W and multiple first color photosensitive pixels A, the multiple transparent photosensitive pixels W locate in the same column, and the multiple first color photosensitive pixels A locate in the same column. A second type of sub-unit UB includes multiple transparent photosensitive pixels W and multiple second color photosensitive pixels B, the multiple transparent photosensitive pixels W locate in the same row, and the multiple second color photosensitive pixels B locates in the same row. A third type of sub-unit UC includes multiple transparent photosensitive pixels W and multiple third color photosensitive pixels C, the multiple transparent photosensitive pixels W locates in the same column, and the multiple third color photosensitive pixels C locates in the same column. Each minimum repeating unit includes four sub-units, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Thus, as illustrated in FIG. 11, in the same minimum repeating unit, the multiple photosensitive pixels 110 located in the same row in some sub-units belong to the same type of photosensitive pixel 110, and the multiple photosensitive pixels 110 located in the same column in some other sub-units belong to the same type of photosensitive pixel 110.

Figure 12:
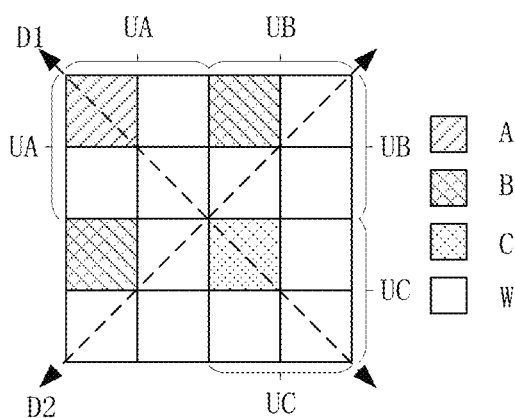

In still yet another example, FIG. 12 is a schematic diagram illustrating still another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| A | W | B | W |
|---|---|---|---|
| W | W | W | W |
| B | W | C | W |
| W | W | W | W | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 12, there is only one photosensitive pixel among the four photosensitive pixels 110 of each sub-unit. In each minimum repeating unit, the color photosensitive pixel may be located at any position in the sub-unit (for example, located at the upper left position of the sub-unit as illustrated in FIG. 12).

As illustrated in FIG. 12, there are three types of sub-units. Specifically, a first type of sub-unit UA includes multiple transparent photosensitive pixels W and one first color photosensitive pixel A; a second type of sub-unit UB includes multiple transparent photosensitive pixels W and one second color photosensitive pixel B; and a third type of sub-unit UC includes multiple transparent photosensitive pixels W and one third color photosensitive pixel C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 13:
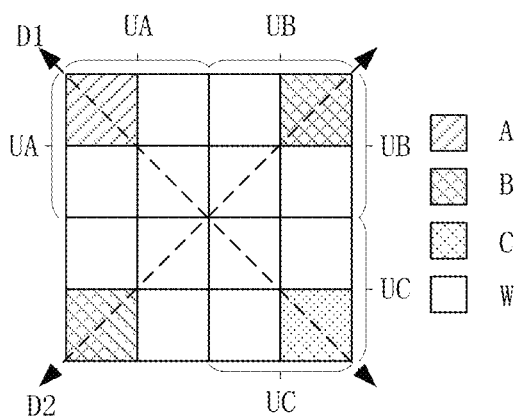

In still yet another example, FIG. 13 is a schematic diagram illustrating still another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| A | W | W | B |
|---|---|---|---|
| W | W | W | W |
| W | W | W | W |
| B | W | W | C | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 13, there is only one photosensitive pixel among the four photosensitive pixels 110 of each sub-unit. In each minimum repeating unit, the color photosensitive pixel may be located at any position in the sub-unit (for example, located at the upper left position, the lower left corner, the upper right corner, or the lower right corner of the sub-unit as illustrated in FIG. 12).

As illustrated in FIG. 13, there are three types of sub-units. Specifically, a first type of sub-unit UA includes multiple transparent photosensitive pixels W and one first color photosensitive pixel A; a second type of sub-unit UB includes multiple transparent photosensitive pixels W and one second color photosensitive pixel B; and a third type of sub-unit UC includes multiple transparent photosensitive pixels W and one third color photosensitive pixel C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 14:
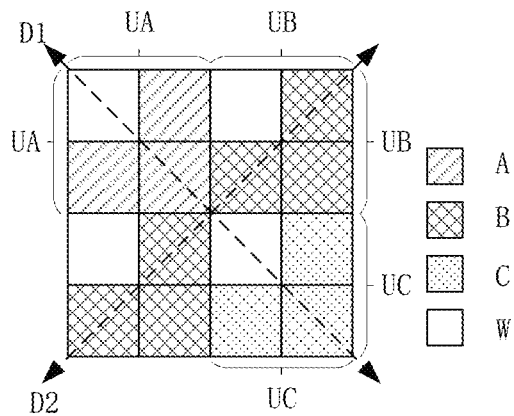

For still yet another example, FIG. 14 is a schematic diagram illustrating still another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| W | A | W | B |
|---|---|---|---|
| A | A | B | B |
| W | B | W | C |
| B | B | C | C | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 14, there is only one transparent photosensitive pixel W among the four photosensitive pixels 110 of each sub-unit. In each minimum repeating unit, the transparent photosensitive pixel W may be located at any position in the sub-unit (for example, located at the upper left position of the sub-unit as illustrated in FIG. 14).

As illustrated in FIG. 14, there are three types of sub-units. Specifically, a first type of sub-unit UA includes one transparent photosensitive pixel W and multiple first color photosensitive pixels A; a second type of sub-unit UB includes one transparent photosensitive pixel W and multiple second color photosensitive pixels B; and a third type of sub-unit UC includes one transparent photosensitive pixel W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 15:
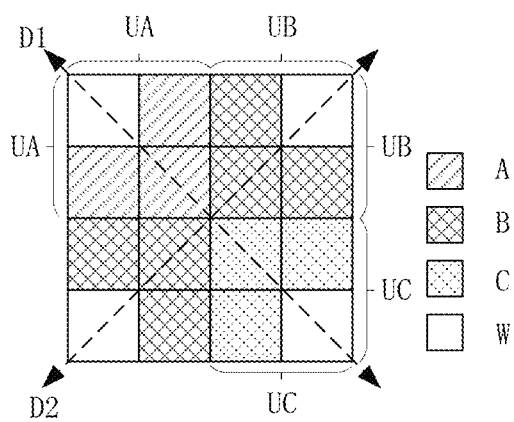

In still yet another example, FIG. 15 is a schematic diagram illustrating still another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| W | A | B | W |
|---|---|---|---|
| A | A | B | B |
| B | B | C | C |
| W | B | C | W | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 15, there is only one transparent photosensitive pixel W among the four photosensitive pixels 110 of each sub-unit. In each minimum repeating unit, the transparent photosensitive pixel W may be located at any position in the sub-unit (for example, located at the upper left position, the lower left position, the upper right position or the lower right position of the sub-unit as illustrated in FIG. 15).

As illustrated in FIG. 15, there are three types of sub-units. Specifically, a first type of sub-unit UA includes one transparent photosensitive pixel W and multiple first color photosensitive pixels A; a second type of sub-unit UB includes one transparent photosensitive pixel W and multiple second color photosensitive pixels B; and a third type of sub-unit UC includes one transparent photosensitive pixel W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

In some embodiments, in the minimum repeating unit illustrated in FIGS. 5 to 15, the first color photosensitive pixel A may be the red photosensitive pixel R; the second color photosensitive pixel B may be a green photosensitive pixel G; and the third color photosensitive pixel C may be the blue photosensitive pixel Bu.

In some embodiments, in the minimum repeating unit illustrated in FIGS. 5 to 15, the first color photosensitive pixel A may be the red photosensitive pixel R; the second color photosensitive pixel B may be a yellow photosensitive pixel Y; and the third color photosensitive pixel C may be the blue photosensitive pixel Bu.

In some embodiments, in the minimum repeating unit illustrated in FIGS. 5 to 15, the first color photosensitive pixel A may be the magenta photosensitive pixel R; the second color photosensitive pixel B may be a cyan photosensitive pixel Cy; and the third color photosensitive pixel C may be the yellow photosensitive pixel Y.

It should be noted that, in some embodiments, the response band of the transparent photosensitive pixel W is a visible light band (for example, 400 nm-760 nm). For example, the transparent photosensitive pixel W is provided with an infrared filter for filtering out infrared light. In some other embodiments, the response band of the transparent photosensitive pixel W includes the visible light wavelength band and a near-infrared wavelength band (for example, 400 nm-1000 nm), in which the response band matches the response band of the photoelectric conversion element 1111 (as illustrated in FIG. 4) in the image sensor 10 (as illustrated in FIG. 1). For example, the transparent photosensitive pixel W may not be provided with a filter or may be provided with a filter that allows all wavelengths of light to pass through, and the response wavelength band of the transparent photosensitive pixel W is determined based on the response wavelength band of the photoelectric conversion element 1111, that is, the two response wavelength bands are matched. The embodiments of the disclosure include, but are not limited to, the above-mentioned waveband ranges.

Figure 16:
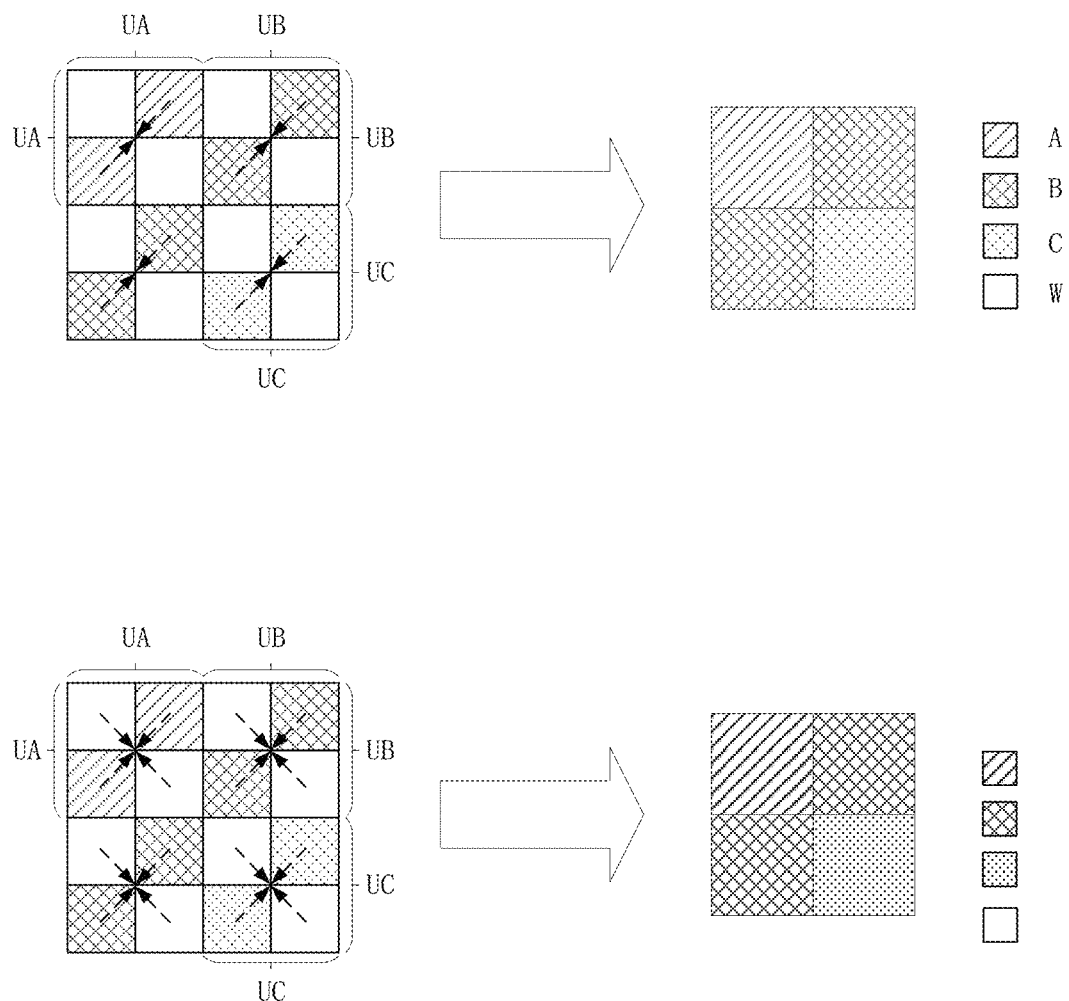
FIG. 16 is a schematic diagram illustrating a principle of acquiring an original image by an image sensor in the camera assembly according to some embodiments of the disclosure.

Referring to FIGS. 1, 2 and 16, in some embodiments, the control unit 13 controls the pixel array 11 to be exposed to thereby acquiring a first color original image and a second color original image. Specifically, the first color original image is composed of multiple pieces of first color original image data, each piece of first color original image data is generated by the at least one color photosensitive pixel of the sub-unit, the second color original image is composed of multiple pieces of second color original image data, and each piece of second color original image data is generated by the at least one transparent photosensitive pixel and the at least one color photosensitive pixel in the sub-unit.

Referring to FIG. 2, in an example, each sub-unit of the pixel array 11 includes the multiple transparent photosensitive pixels W and the multiple color photosensitive pixels (as illustrated in FIGS. 5 to 11). After the control unit 13 controls the pixel array 11 to be exposed, a sum or an average of multiple electrical signals, which are generated by the multiple color photosensitive pixels in the sub-unit in response to receiving light, is taken as a piece of the first color original image data, and the multiple pieces of the first color original image data of all sub-units in the pixel array 11 compose the first color original image; a sum or an average of multiple electrical signals, which are generated by the multiple transparent photosensitive pixels W and all the multiple color photosensitive pixel in the sub-unit in response to receiving light, is taken as a piece of the second color original image data, and the multiple pieces of the second color original image data of all sub-units in the pixel array 11 compose the second color original image.

Referring to FIG. 16, for example, a piece of first color original image data is acquired by calculating a sum or an average of two electrical signals generated by two first color photosensitive pixels A in the first type of sub-unit UA in response to receiving light. For each of the two second type of sub-units UB, a piece of first color original image data is acquired by calculating a sum or an average of two electrical signals generated by two second photosensitive pixels B in the second type of sub-unit UB in response to receiving light, thereby acquiring the two pieces of first color original image data. For the third type of sub-unit UC, a piece of first color original image data is acquired by calculating a sum or an average of two electrical signals generated by two third color photosensitive pixels C in the third type of sub-unit UC in response to receiving light. The four pieces of first color original image data together compose a first image unit in the first color original image, and multiple pixels in the first image unit are arranged in the form of ABBC. For the first type of sub-unit UA, a piece of the second color original image data is acquired by calculating a sum or an average of two electrical signals, which are generated by the two transparent photosensitive pixels W in response to receiving light, and two electrical signals, which are generated by the two first color photosensitive pixels A in response to receiving light. For each of the two second type of sub-units UB, a piece of the second color original image data is acquired by calculating a sum or an average of two electrical signals, which are generated by the two transparent photosensitive pixels W in the second type of sub-unit UB in response to receiving light, and two electrical signals, which are generated by the two second color photosensitive pixels B in the second type of sub-unit UB in response to receiving light, thereby acquiring two pieces of the second color original image data. For the third type of sub-unit UC, a piece of the second color original image data is acquired by calculating a sum or an average of two electrical signals, which are generated by the two transparent photosensitive pixel W in response to receiving the light, and two electrical signals, which are generated by the two third color photosensitive pixels C in response to receiving light. The four pieces of the second color original image data together compose a second image unit in the second color original image, and multiple pixels in the second image unit are arranged in the form of ABBC.

It should be noted that, in another example, when each sub-unit includes a transparent photosensitive pixel, an electrical signal generated by the transparent photosensitive pixel in response to receiving light is taken as a piece of the first color original image data, and a sum or an average of an electrical signal generated by the color photosensitive pixel in response to receiving light and all electrical signal generated by all the transparent photosensitive pixel in response to receiving light is taken as a piece of the second color original image data. In still another example, when each sub-unit includes a transparent photosensitive pixel W, a sum or an average of an electrical signal generated by the transparent photosensitive pixel W in response to receiving light and all electrical signal generated by all the color photosensitive pixel in the sub-unit in response to receiving light is taken as a piece of the second color original image data.

Figure 17:
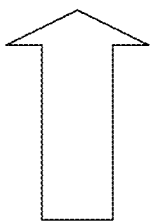
FIGS. 17 and 18 are schematic diagrams illustrating a principle of performing interpolation on the first color original image according to some embodiments of the disclosure.

Referring to FIGS. 1 and 17, after acquiring the first color original image and the second color original image, the image sensor 10 performs, for each color channel, the interpolation on the first color original image to acquire the first interpolated image of the color channel, and performs the interpolation on the second color original image to acquire the second interpolated image of at least one color channel.

In an example, a reference area 112 for the interpolation processing of the first color original image may be an area of size 7×7 (as illustrated in FIG. 17), where A represents the first color photosensitive pixel in the first color original image; B represents the second color photosensitive pixel in the first color original image; C represents the third color photosensitive pixel in the first color original image. Based on the principles that local color difference is constant and the interpolation of adjacent pixels along the interpolation direction is constant, a demosaicing algorithm may be used to perform the interpolation on the first color original image to thereby acquire the first interpolated image of the second color channel. When the pixel in the first color original image has image data of the second color channel, the image data of the second color channel of the pixel in the first color original image is taken as image data of the second color channel of the pixel in the first interpolated image. For example, B12'=B12. It requires performing the interpolation, when the pixel in the first color original image has image data of the first color channel or image data of the third color channel. For example, the interpolation is performed on a pixel C44 in the first color original image that has the image data of the third color channel, and a missed second color photosensitive pixel B44' corresponding to the C44 may be acquired through the following two equations, and the missed pixel is filled by the interpolation to obtain the first interpolated image of the second color channel.

$$\tilde{B}34 = B34 + \frac{(C44 - C24)}{2}$$

$$\tilde{B}43 = B43 + \frac{(C44 - C42)}{2}$$

$$\tilde{B}45 = B45 + \frac{(C44 - C46)}{2}$$

$$\tilde{B}54 = B54 + \frac{(C44 - C64)}{2}; \text{ and}$$

$$\alpha 34 = \frac{1}{1 + |B54 - B34| + |B34 - B14| + |C44 - C24| + \frac{|B43 - B23|}{2} + \frac{|B45 - B25|}{2}}$$

$$\alpha 43 = \frac{1}{1 + |B45 - B43| + |B43 - B41| + |C44 - C42| + \frac{|B34 - B32|}{2} + \frac{|B54 - B52|}{2}}$$

$$\alpha 45 = \frac{1}{1 + |B43 - B45| + |B45 - B47| + |C44 - C46| + \frac{|B34 - B36|}{2} + \frac{|B54 - B56|}{2}}$$

$$\alpha 54 = \frac{1}{1 + |B34 - B54| + |B54 - B74| + |C44 - C64| + \frac{|B43 - B63|}{2} + \frac{|B45 - B65|}{2}}$$

The missed second color photosensitive pixel B44' corresponding to C44 may be acquired through the two equations.

$$B44' = \frac{\alpha 34 \tilde{B}34 + \alpha 43 \tilde{B}43 + \alpha 45 \tilde{B}45 + \alpha 54 \tilde{B}54}{\alpha 34 + \alpha 43 + \alpha 45 + \alpha 54}$$

The interpolation, which is performed on the pixel in the first color original image that has the image data of the first color channel to acquire the first interpolated image of the second color channel, is similar to the interpolation that is performed on the pixel having the image data of the third color channel to acquire the first interpolated image of the second color channel. Details are not repeated herein.

Figure 18:
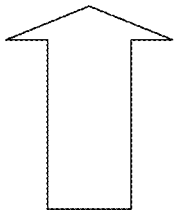

In another example, a reference area 113 for the interpolation processing of the first color original image may be an area of size 7×7 (as illustrated in FIG. 18), where A represents the first color photosensitive pixel in the first color original image; B represents the second color photosensitive pixel in the first color original image; C represents the third color photosensitive pixel in the first color original image. Based on the principles that the local color difference is constant and the interpolation of adjacent pixels along the interpolation direction is constant, the demosaicing algorithm may be used to perform the interpolation on the first color original image to thereby acquire a first interpolated image of the first color channel. When the pixel in the first color original image has the image data of the first color channel, the image data of the first color channel of the pixel in the first color original image is taken as the image data of the corresponding pixel in the first interpolated image of the first color channel. For example, A11'=A11. It requires performing the interpolation, when the pixel in the first color original image has image data of the third color channel. For example, the interpolation is performed on a pixel C44, and a missed second color photosensitive pixel A44' corresponding to the C44 may be acquired through the following two equations, and the missed pixel is filled by the interpolation to obtain the first interpolated image of the first color channel. Specifically, image data of pixels B33', B35', B44', B53' and B55' may be acquired according to the calculation manner illustrated in FIG. 17.

$$\tilde{A}33 = A33 + \frac{(B44' - B33')}{\sqrt{2}}$$

$$\tilde{A}35 = A35 + \frac{(B44' - B35')}{\sqrt{2}}$$

$$\tilde{A}53 = A53 + \frac{(B44' - B53')}{\sqrt{2}}$$

$$\tilde{A}55 = A55 + \frac{(B44' - B55')}{\sqrt{2}}; \text{ and}$$

$$\alpha33 = \frac{1}{1 + |B44' - B33'| + \frac{|C44 - C22|}{2}}$$

$$\alpha35 = \frac{1}{1 + |B44' - B35'| + \frac{|C44 - C26|}{2}}$$

$$\alpha53 = \frac{1}{1 + |B44' - B53'| + \frac{|C44 - C62|}{2}}$$

$$\alpha55 = \frac{1}{1 + |B44' - B55'| + \frac{|C44 - C66|}{2}}$$

The missed second color photosensitive pixel A44' corresponding to C44 may be acquired through the two equations.

$$A44' = \frac{\alpha33\tilde{A}34 + \alpha35\tilde{A}35 + \alpha53\tilde{A}53 + \alpha55\tilde{A}55}{\alpha33 + \alpha35 + \alpha53 + \alpha55}$$

Referring to FIG. 18, the interpolation is performed on the first color original image to acquire the first interpolated image of the first color channel. It requires to perform the interpolation, when the pixel in the first color original image has image data of the second color channel. For example, the interpolation is performed on a pixel B34, and a missed first color photosensitive pixel A34' corresponding to the B34 may be acquired through the following two equations, and the missed pixel is filled by the interpolation to obtain the first interpolated image of the first color channel.

$$\tilde{A}33 = A33 + \frac{(B34 - B31)}{2}$$

$$\tilde{A}35 = A35 + \frac{(B34 - B36)}{2}$$

$$\alpha33 = \frac{1}{1 + \frac{|B34 - B21|}{2} + \frac{|A33 - A35|}{2}}$$

$$\alpha35 = \frac{1}{1 + \frac{|B34 - B36|}{2} + \frac{|A33 - A35|}{2}}$$

$$A34' = \frac{\alpha33\tilde{A}33 + \alpha35\tilde{A}35}{\alpha33 + \alpha35}$$

In the above examples, the interpolation, which is weighted with both left and right directions, is performed on the pixel in the first color original image that has the image data of the second color channel to acquire the interpolated image of the first color channel. For example, the interpolation direction of the missed first color photosensitive A34' corresponding to the B34 is to perform the weighting with both the left and right directions. In at least one alternative embodiment, the interpolation, which is weighted by both up and down directions is performed on the pixel in the first color original image that has the image data of the second color channel to acquire the interpolated image of the first color channel. For example, the interpolation direction for calculating the missed first color photosensitive A45' corresponding to the B45 is to weight with both up and down directions. The calculation method of weighting with the left and right directions is similar to the calculation method of weighting with the upper and lower directions, and details are not described here.

Based on the principles that local color difference is constant and the interpolation of adjacent pixels along the interpolation direction is constant, the demosaicing algorithm may be used to perform the interpolation on the first color original image to thereby acquire a first interpolated image of the third color channel. When the pixel in the first color original image has image data of the third color channel, the image data of the third color channel of the pixel in the third color original image is taken as image data of a pixel in the first interpolated image of the third color channel. It requires to perform the interpolation when the pixel in the first color original image has the data map of the first color channel or the second color channel. The interpolation, which is performed on the pixel in the first color original image that has the image data of the first color channel to acquire the first interpolated image of the third color channel, is similar to the interpolation that is performed on the pixel having the image data of the third color channel to acquire the first interpolated image of the first color channel. Details are not repeated herein. The interpolation is performed on the pixel in the first color original image that having the image data of the second color channel, so as to acquire the first interpolated image of the third color channel, which is similar to the interpolation that is performed on the pixel having the image data of the second color channel to acquire the first interpolated image of the first color channel. Details are not repeated herein.

In the embodiments of the disclosure, the processor 20 may adopt the demosaicing algorithm to perform the interpolation on the second color original image, so as to acquire a second interpolated image of at least one color channel. The processor 20 may perform the interpolation on the second color original image in a manner similar to the embodiment illustrated in FIGS. 17 and 18 to obtain at least one of the second interpolated image of the first color channel, the second interpolated image of the second color channel, and the second interpolated image of the second color channel. Details will not be described here.

In some embodiments, a shape of a window formed by the reference area for the interpolation performed on the first color original image and the second color original image may be a square, or other shapes such as a rectangle, which are not limited thereto. Size of the reference area for the interpolation performed on the first color original image and the second color original image may be 3×3, 4×4, 5×5, 3×5, 5×7, 7×7, 9×5, etc., which is not limited thereto. In some embodiments, the interpolation method of the first color original image and the second color original image may also be other commonly used demosaicing algorithms, such as nearest neighbor interpolation, linear interpolation, cubic interpolation, high-quality linear interpolation method, smooth hue transition interpolation, pattern recognition interpolation, adaptive color plane interpolation, interpolation algorithm based on orientated weighted gradient, etc.

In some embodiments, after acquiring the first interpolated image and the second interpolated image, the image sensor 10 fuses, for each color channel, the second interpolated image with the first interpolated image of the color channel to obtain a fused image of the color channel, thereby obtaining the fused images of the multiple color channels. In an example, the second interpolated image of the second color channel is fused with the first interpolated image of each color channel to obtain the fused image of each color channel. The second interpolated image of the second color channel is fused with the first interpolated image of the first color channel to obtain the fused image of the first color channel. The second interpolated image of the second color channel is fused with the first interpolated image of the second color channel to obtain the fused image of the second color channel. The second interpolated image of the second color channel is fused with the first interpolated image of the third color channel to obtain the fused image of the third color channel. A target image is obtained based on the fused images of the multiple color channel. In some embodiments, the second color channel may be a green channel corresponding to the green photosensitive pixel G.

In some embodiments, after the first interpolated image of the multiple color channel and the second interpolated image of the at least one color channel are acquired, the first interpolated image of the multiple color channel and the second interpolated image of the at least one color channel may be processed by the operation as follows. Specifically, the processor 20 may filter, for each of the multiple color channels, the first interpolated image of the color channel to obtain a first filtered image of the color channel; and the first filtered image is composed of multiple pieces of first filtered image data. Specifically, the processor 20 may filter the second interpolated image of the at least one color channel to obtain a second filtered image of the at least one color channel; and the second filtered image is composed of multiple pieces of second filtered image data.

Figure 19:
FIGS. 19 to 22 are schematic diagrams each illustrating a principle of filtering a first interpolated image according to some embodiments of the disclosure.
Figure 19:

In some embodiments, the processor may filter the first interpolated image of each color channel to obtain the first filtered image of each color channel in a manner as follows. Specifically, the processor 20 may determine a first to-be-filtered pixel and a first to-be-filtered area in the first interpolated image of the first color channel, and the first to-be-filtered pixel is located in the first to-be-filtered area. The processor 20 may determine a first reference pixel and a first reference area in the second interpolated image, where the first reference pixel corresponds to the first to-be-filtered pixel, and the first reference area corresponds to the first to-be-filtered area. For example, with regard to the processor 20 filtering the first interpolated image of the first color channel (as illustrated in FIG. 19), the processor 20 determines a pixel A44' as the first to-be-filtered pixel, and then the processor 20 may determine the first to-be-filtered area 116 according to the first to-be-filtered pixel A44', and then the processor 20 may determine the first reference pixel B'44' and the first reference area 119 in the second interpolated image, in which the first reference pixel B'44' corresponds to the first to-be-filtered pixel A44', and the first reference area 119 corresponds to the first to-be-filtered area 116 of the first color channel. It should be noted that, the first to-be-filtered pixel A44' of the first color channel may be located at any position in the first to-be-filtered area 116 of the first channel; a shape of a window formed by the first reference area 119 may be a square, or other shapes such as a rectangle, which is not limited thereto. The size of the first reference area 119 may be 3×3, 4×4, 5×5, 3×5, 5×7, 7×7, or 9×5, etc., which is not limited thereto. In an illustrated embodiment, the first reference area 119 is an area of size 3×3. Multiple first pixels in the first reference area 119 include B'33', B'34', B'35', B'43', B'44', B'45', B'53', B'54' and B'55'. For each of the multiple first pixels, i.e., B'33', B'34', B'35', B'43', B'44', B'45', B'53', B'54' and B'55, in the first reference area 119, the processor 20 calculates a weight for the first pixel relative to the first reference pixel B'44', and the weight includes a weight in a spatial domain and a weight in a range domain. A pixel value of the first to-be-filtered pixel of the first color channel is corrected to obtain one piece of the first filtered image data of the first color channel, according to the weights for the multiple first pixels, i.e., B'33', B'34', B'35', B'43', B'44', B'45', B'53', B'54' and B'55, and pixel values of pixels corresponding to the first to-be-filtered area 116 of the first color channel.

Figure 21:
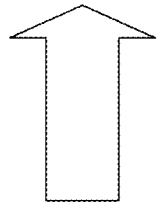

Referring to FIG. 21, the processor 20 may calculate the weights in the spatial domain for the multiple first pixels, i.e., B'33', B'34', B'35', B'43', B'44', B'45', B'53', B'54' and B'55', relative to the first reference pixel B'44' according to a weight function $f(\|p-q\|)$, where p represents the coordinates of the first reference pixel B'44' in the first reference area 119, q represents the coordinates of the multiple first pixels, i.e., B'33', B'34', B'35', B'43', B'44', B'45', B'53', B'54', in the first reference area 119, and f represents the weight function in the spatial domain. Specifically, for each of the multiple first pixels, the smaller the coordinate difference between the first reference pixel B'44' and the first pixel (that is, the closer the first reference pixel B'44' is to the first pixel), the higher the weight in the spatial domain for first reference pixel B'44' relative to the first pixel. The processor 20 may calculate the weights in the range domain for the multiple first pixels, i.e., B'33', B'34', B'35', B'43', B'44', B'45', B'53', B'54' and B'55', relative to the first reference pixel B'44' according to a weight function $g(\|\tilde{I}_p - \tilde{I}_q\|)$, where $\tilde{I}_p$ represents first interpolated image data (may also be understood as a pixel value) of the first reference pixel B'44' in the first reference area 119, and $\tilde{I}_q$ represents first interpolated image data (may also be understood as pixel values) of the multiple first pixels, i.e., B'33', B'34', B'35', B'43', B'44', B'45', B'53', B'54', in the first reference area 119, and g represents the weight function in the range domain. Specifically, for each of the multiple first pixels, the larger the difference between the first interpolated image data of the first reference pixel B'44' and the first interpolated image data of the first pixel, the smaller the weight in the range domain.

Figure 20:
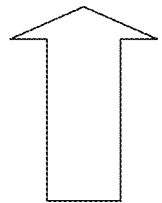

After acquiring the weights for the multiple first pixels, the processor 20 may correct, according to the weights for the multiple first pixels and the pixel values of pixels corresponding to the first to-be-filtered area of the first color channel, a pixel value of the first to-be-filtered pixel of the first color channel to obtain one piece of the first filtered image data of the first color channel. Referring to FIGS. 19 and 20, the processor 20 may calculate according to the equation $$J_p = \frac{1}{k_p} \sum_{q \in \Omega} I_q f(\|p-q\|) g(\|\tilde{I}_p - \tilde{I}_q\|),$$

where $k_p = \sum_{q \in \Omega} f(\|p-q\|) g(\|\tilde{I}_p - \tilde{I}_q\|)$, $J_p$ is the first filtered image data (i.e., an output pixel value) of the first color channel, $k_p$ is a sum of the weights for the first reference area 119, $\Omega$ is the filter window, $I_q$ is the pixel value of the pixel, i.e., A33', A34', A35', A43', A44', A45', A53', A54', and A55', corresponding to the first to-be-filtered area 116. As such, through the calculation, the processor 20 may acquire the first filtered image data, i.e., A33", A34", A35", A43", A44", A45", A53", A54", and A55" of respective first to-be-filtered pixels, i.e., A33', A34', A35', A43', A44', A45', A53', A54', and A55', in the first to-be-filtered area 116. The processor 20 may traverse each pixel in the first interpolated image of the first color channel to obtain the multiple pieces of first filtered image data of the first color channel. In other words, the processor 20 may determine each pixel in the first interpolated image of the first color channel as the first to-be-filtered pixel and filter each pixel in a manner of the embodiments illustrated in FIG. 20, thereby obtaining the first filtered image data of the first color channel corresponding to the pixel. After acquiring the multiple pieces of the first filtered image data of the first color channel, the multiple pieces of the first filtered image data of the first color channel may compose the first filtered image of the first color channel.

It can be understood that, the first filtered images of the multiple color channels are obtained by filtering the first interpolated images of the multiple color channels, respectively. Specifically, the first filtered image is composed of multiple pieces of first filtered image data, the first filtered image data may be obtained by performing the correction based on the weights for the first pixels in the second interpolated image and the pixel values of the pixels corresponding to the first to-be-filtered area. The second interpolated image is acquired by performing the interpolation on the second color original image having the transparent photosensitive pixel W and at least one color photosensitive pixel. Thus, the weights for the first pixels in the second interpolated image are used to filter the first interpolated image of each color channel, which can make the first filtered image of each color channel have high light intake and sharpness, while the first filtered image data can be calculated precise.

Similarly, the processor 20 may also filter the first interpolated image of the second color channel. For example, the processor 20 takes the pixel B44' as a first to-be-filtered pixel, and the processor 20 may determine a first to-be-filtered area 117 (as illustrated in FIG. 21) of the second color channel according to the first to-be-filtered pixel B44'. The processor 20 may determine a first reference pixel B'44' and a first reference area 119 in the second interpolated image. Specifically, the first reference pixel B'44' corresponds to the first to-be-filtered pixel B44' of the second color channel; and the first reference area 119 corresponds to the first to-be-filtered area 117 of the second color channel. For each of the multiple first pixels, i.e., B'33', B'34', B'35', B'43', B'44', B'45', B'53', B'54' and B55', in the first reference area 119, the processor 20 calculates a weight for the first pixel relative to the first reference pixel B'44', and the weight includes a weight in a spatial domain and a weight in a range domain. A pixel value of the first to-be-filtered pixel of the second color channel is corrected to obtain a piece of the first filtered image data of the second color channel, according to the weights for the multiple first pixels and pixel values of pixels corresponding to the first to-be-filtered area 117 of the second color channel. The processor may filter the first interpolated image of the second color channel to obtain a first filtered image of the second color channel like the embodiments illustrated in FIG. 20. Details are not described here.

Figure 22:
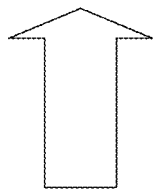

Similarly, the processor 20 may also filter the first interpolated image of the third color channel. For example, the processor 20 takes a pixel C44' as a first to-be-filtered pixel, and the processor 20 may determine a first to-be-filtered area 118 (as illustrated in FIG. 22) of the third color channel according to the first to-be-filtered pixel C44'. The processor may determine a first reference pixel B'44' and a first reference area 119 in the second interpolated image, in which the first reference pixel B'44' corresponds to the first to-be-filtered pixel C44' of the third color channel, and the first reference area 119 corresponds to the first to-be-filtered area of the third color channel. Multiple first pixels in the first reference area 119 include B'33', B'34', B'35', B'43', B'44', B'45', B'53', B'54' and B'55'. For each of the multiple first pixels, i.e., B'33', B'34', B'35', B'43', B'44', B'45, B'53', B'54' and B'55, in the first reference area 119, the processor 20 calculates weights for the first pixel relative to the first reference pixel B'44', and the weight includes the weight in a spatial domain and the weight in a range domain. A pixel value of the first to-be-filtered pixel of the third color channel is corrected to obtain a piece of the first filtered image data of the third color channel, according to the weights for the multiple first pixels, and pixel values of pixels corresponding to the first to-be-filtered area 118 of the third color channel. The processor 20 may filter the first interpolated image of the third color channel to obtain a first filtered image of the third color channel like the embodiments illustrated in FIG. 20. Details are not described here.

Figure 23:
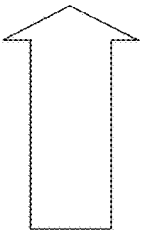
FIG. 23 is a schematic diagram illustrating a principle of filtering a second interpolated image according to some embodiments of the disclosure.

The second filtered image is composed of multiple pieces of second filtered image data, and the second interpolated image is filtered to obtain the second filtered image. Specifically, the processor 20 may determine a second to-be-filtered pixel and a second to-be-filtered area in the second interpolated image, and the second to-be-filtered pixel is located in the second to-be-filtered area. For each of the multiple second pixels in the second to-be-filtered area, the processor 20 may calculate a weight for the second pixel relative to the second to-be-filtered pixel, and the weight includes a weight in a spatial domain and a weight in a range domain. The processor 20 may correct, according to the pixel values of the multiple second pixels and the weights for the multiple second pixels, pixel values of the second to-be-filtered pixels to obtain a piece of the second filtered image data. The processor 20 may traverse each pixel in the second interpolated image to obtain the multiple pieces of second filtered image data. For example, the processor 20 filters the second interpolated image of the second color channel (as illustrated in FIG. 23), the processor 20 may determine a pixel B'44' in the second interpolated image of the second color channel as the second to-be-filtered pixel of the second color channel, and then the processor 20 may determine the second to-be-filtered area 120 of the second color channel according to the second to-be-filtered pixel B'44' of the second color channel. It should be noted that, the second to-be-filtered pixel B'44' of the second color channel may be located anywhere in the second to-be-filtered area 120 of the second color channel. A shape of a window formed by the second to-be-filtered area 120 of the second color channel may be a square, or other shapes such as a rectangle, which are not limited thereto. The size of the second to-be-filtered area 120 may be 3×3, 4×4, 5×5, 3×5, 5×7, 7×7, or 9×5, etc., which is not limited thereto. In an illustrated embodiment, the second to-be-filtered area 120 of the second color channel is an area of size 3×3. The multiple second reference pixels of the second color channel in the second to-be-filtered area 120 of the second color channel further include: B'33', B'34', B'35', B'43', B'44', B'45', B'53', B'54' and B'55'. For each of the second reference pixels i.e., B'33', B'34', B'35', B'43', B'44', B'45', B'53', B'54' and B'55', of the second color channel, the processor 20 calculates a weight for the second reference pixel relative to the second to-be-filtered pixel B'44' of the second color channel, in which the weight includes a weight in a spatial domain and a weight in a range domain. Specifically, the processor 20 may calculate the weights in the spatial domain of the multiple second reference pixels, i.e., B'33', B'34', B'35', B'43', B'44', B'45', B'53', B'54' and B'55', of the second color channel relative to the second to-be-filtered pixel of the second color channel B'44' according to a weight function f(∥p−q∥), where p represents the coordinates of the second to-be-filtered pixel B'44' in the second to-be-filtered area 120 of the second color channel, and q represents the coordinates of the multiple second reference pixels, i.e., B'33', B'34', B'35', B'43', B'44', B'45', B'53', B'54', of the second color channel in the second to-be-filtered pixel area 120, and f represents the weight function in the spatial domain. Specifically, for each of the multiple second reference pixels of the second color channel, the smaller the coordinate difference between the second to-be-filtered pixel of the second color channel B'44' and the second reference pixel of the second color channel (that is, the closer the second to-be-filtered pixel B'44' of the second color channel is to the second reference pixel of the second color channel), the higher the weight in the spatial domain for the second to-be-filtered pixel B'44' of the second color channel relative to the second reference pixel of the second color channel. The processor 20 may calculate the weights in the spatial domain for the multiple second reference pixels, i.e., B'33', B'34', B'35', B'43', B'44', B'45', B'53', B'54' and B'55', of the second color channel relative to the second to-be-filtered pixel B'44' of the second color channel according to a weight function g(∥Ĩ$_p$−Ĩ$_q$∥), where Ĩ$_p$ represents second interpolated image data (may also be understood as a pixel value) of the second to-be-filtered pixel B'44' of the second color channel, Ĩ$_q$ represents second interpolated image data (may also be understood as pixel values) of the multiple second reference pixels, i.e., B'33', B'34', B'35', B'43', B'44', B'45', B'53', B'54' and B'55', of the second color channel and g represents the weight function in the range domain. Specifically, for each of the multiple second reference pixels of the second color channel, the larger the difference between the second interpolated image data of the second to-be-filtered pixel B'44' of the second color channel and the second interpolated image data of the second reference pixel of the second color channel, the smaller the weight in the range domain. The processor may correct, according to the pixel values and the weights for the multiple second reference pixels of the second color, the pixel value of the second to-be-filtered pixel to obtain one of the multiple pieces of the second filtered image data of the second color channel. Specifically, the processor 20 may perform the calculation according to the equation $$J_p = \frac{1}{k_p}\sum\nolimits_{q \in \Omega} I_q f(\|p-q\|)g(\|\tilde{I}_p - \tilde{I}_q\|),$$

where $k_p = \Sigma_{q \in \Omega} f(\|p-q\|)g(\|\tilde{I}_p-\tilde{I}_q\|)$, $J_p$ is the second filtered image data (i.e., an output pixel value) of the second color channel, $k_p$ is a sum of weights for the second to-be-filtered area 119 of the second color channel, $\Omega$ is a filtering window, and $I_q$ is the pixel value of the second to-be-filtered pixel of the second color channel. The processor 20 may traverse each pixel in the second interpolated image of the second color channel to obtain the multiple pieces of the second filtered image data of the second color channels, and the processor 20 may compose the multiple pieces of the second filtered image data of multiple second color channels into the second filtered image of the second color channel.

The processor 20 may also filter the second interpolated image of the first color channel and the second interpolated image of the third color channel to obtain the second filtered image of the first color channel and the second filtered image of the third color channel respectively, in a manner similar to the embodiments illustrated in FIG. 23. Details are not described here.

In the embodiments of the disclosure, by filtering the first interpolated image and the second interpolated image, the flat area in the filtered image is smooth, while protecting the edge area in the filtered image from being blurred and therefore be prominent, which is conducive to improving the imaging quality of the camera assembly 100 (illustrated in FIG. 1).

After the processor 20 filters, for each of the multiple color channels, the first interpolated image of the color channel to obtain the first filtered image of the color channel and filters the second interpolated image of at least one color channel to obtain the second filtered image of the at least one color channel, the processor 20 may further fuse the second filtered image with the first filtered images of the multiple color channels to obtain fused images of the multiple color channels, in which the fused image is composed of multiple pieces of fused image data. An example is described as follows.

The processor may obtain one of the multiple pieces of fused image data by performing a calculation according to one of the multiple pieces of the first filtered image data, one of the multiple pieces of the second filtered image, and one of the multiple pieces of the interpolated image data. Specifically, the fused image data is positively correlated with the first filtered image data, the fused image data is negatively correlated with the second filtered image data, and the fused image data is positively correlated with the interpolated image data. The processor 20 may traverse each pixel in the first filtered image to acquire the multiple pieces of fused image data. For example, $b_1$ represents image data of a preset pixel in the second interpolated image of the second color channel, a represents image data of a pixel corresponding to the preset pixel in the first filtered image of the first color channel, b represents image data of a pixel corresponding to the preset pixel in the first filtered image of the second color channel, c represents image data of a pixel corresponding to the preset pixel in the first filtered image of the third color channel, $b_2$ represents the second filtered image data of the second color channel. It can be obtained that the fused image data of the first color channel is $ab_1/b_2$, the fused image data of the second color channel is $bb_1/b_2$, and the fused image data of the third color channel is $cb_1/b_2$.

In some other embodiments, $a_1$ represents image data of a preset pixel in the second interpolated image of the first color channel, $b_1$ represents image data of the preset pixel in the second interpolated image of the second color channel, and $c_1$ represents image data of the preset pixel in the second interpolated image of the third color channel, a represents image data of a pixel corresponding to the preset pixel in the first filtered image of the first color channel, b represents image data of a pixel corresponding to the preset pixel in the first filtered image of the second color, c represents image data of a pixel corresponding to the preset pixel in the first filtered image of the third color channel, $a_2$ represents the second filtered image data of the first color channel, $b_2$ represents the second filtered image data of the second color channel, and $c_2$ represents the second filtered image data of the third color channel. It can be obtained that the fused image data of the first color channel is $aa_1/a_2$, the fused image data of the second color channel is $bb_1/b_2$, and the fused image data of the third color channel is $cc_1/c_2$.

In some embodiments, when the first filtered image data is greater than a preset pixel value, the processor 20 may determine the first filtered image data as the fused image data. When the first filtered image data is less than or equal to the preset pixel value, the processor 20 may obtain the fused image data by performing the calculation according to the first filtered image data, the second filtered image, and the interpolated image data. Specifically, the fused image data is positively correlated with the first filtered image data, the fused image data is negatively correlated with the second filtered image data, and the fused image data is positively correlated with the interpolated image data. For example, when the image sensor 10 is a 10-bit image sensor, the processor 20 may set the preset pixel value to 959. When the first filtered image data is greater than the preset pixel value of 959, it is determined that the first filtered image data is in an overexposed state, and the processor 20 does not fuse the first filtered image data, and determines the first filtered image data as the fused image data. When the first filtered image data is less than or equal to the preset pixel value of 959, the processor 20 performs the calculation according to the first filtered image data, the second filtered image data, and the interpolated image data, so as to obtain the fused image data.

After obtaining the fused images of the multiple color channels, the fused images of the multiple color channels may be directly converted into a YUV image, and the YUV image is taken as the target image. Alternatively, the pixels in the fused image of each color channel may be taken to form the target image of the Bayer array, and then the target image is transmitted to the image processor (ISP) for processing. In some embodiments, the processor 20 may include a processing circuit and the ISP. The processing circuit is integrated in the image sensor 10 and configured to implement the image acquisition method according to the embodiments of the disclosure. After the target image is obtained, the target image is transmitted to the ISP for performing subsequent image processing thereon.

It may be understood that, the target image is obtained from the fused images of the multiple color channel through performing the interpolation, the filtering and the fusing on the first color original image and the second color original image. The target image is fused with the transparent photosensitive pixel W with large light intake, so that the target image has high signal-to-noise ratio and clarity. In the embodiments of the disclosure, the first color original image inherits the high signal-to-noise ratio and clarity of the second color original image using fusion, which can improve the effect of taking pictures at night and the quality of the image.

Based on the above, the camera assembly 100 according to the embodiments of the disclosure obtains, by exposing the pixel array 11, the first color original image including image data of only monochromatic color channel and the second color original image including image data of both the monochromatic color channel and panchromatic color channel, the camera assembly 100 performs the interpolation, the filtering and the fusing on the first color original image and the second color original image, to improve the signal-to-noise ratio and the clarity of the image by using the image data of the panchromatic color channel, so that the quality of the image taken in the dark environment can be improved, the flat area in the image is smooth, and the edge area in the image is prominent to further improve the quality of the image.

Figure 24:
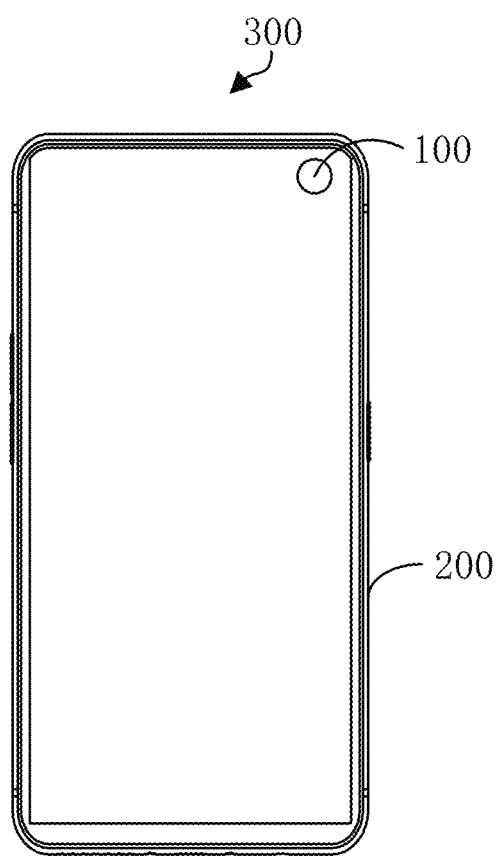
FIG. 24 is a schematic structural diagram illustrating a terminal device according to some embodiments of the disclosure.
Figure 25:
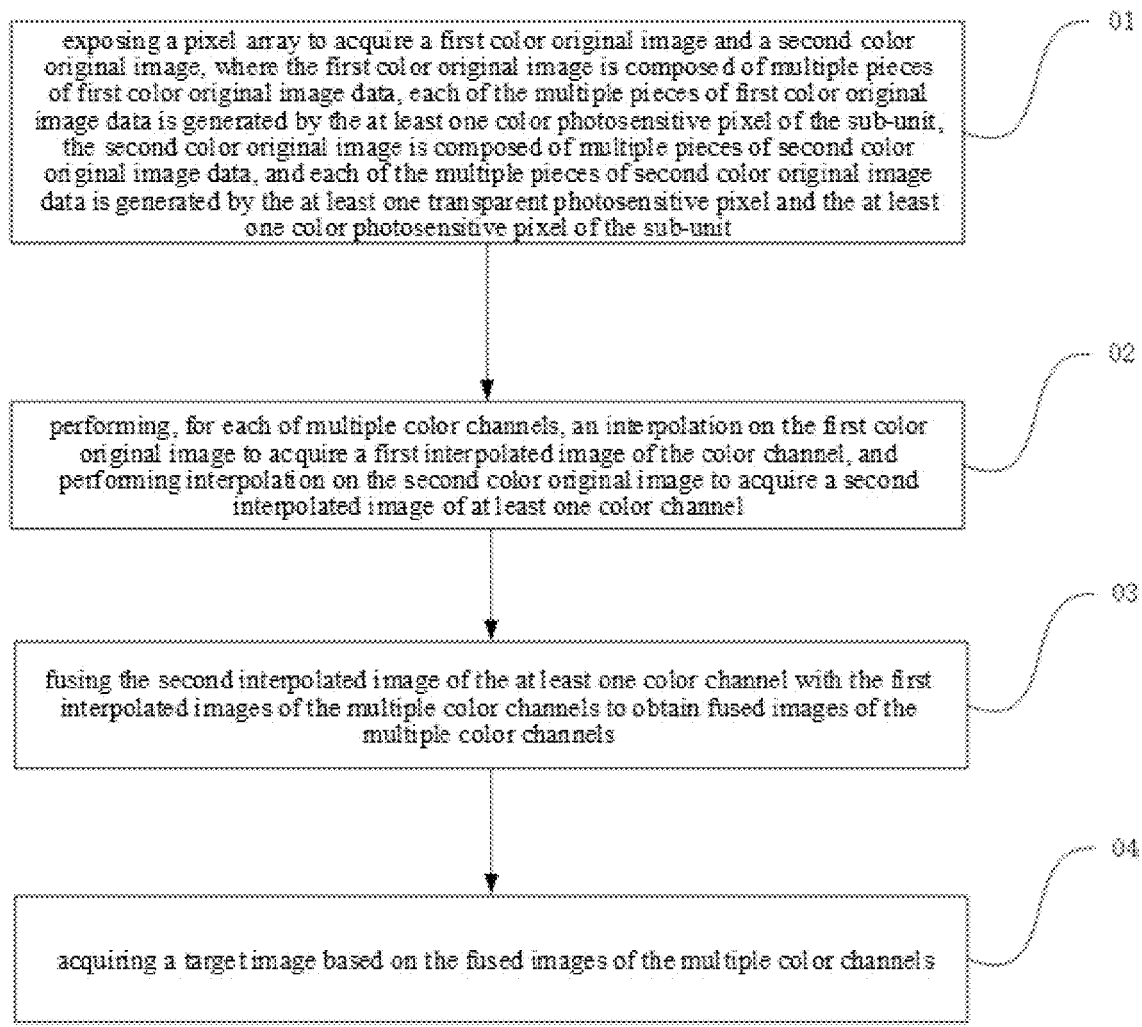
FIG. 25 is a schematic flowchart illustrating an image acquisition method according to some embodiments of the disclosure.

Referring to FIG. 24, the disclosure further provides a mobile terminal 300. The mobile terminal 300 includes the camera assembly 100 described in any one of the foregoing embodiments and a housing 200. The camera assembly 100 is combined with the housing 200.

The mobile terminal 300 may be a mobile phone, a tablet computer, a notebook computer, a smart wearable device (e.g., a smart watch, a smart bracelet, smart glasses, a smart helmet), a drone, a head-mounted display device, etc., which are not limited thereto.

The terminal device 300 according to embodiments of the disclosure obtains, by exposing the pixel array 11, the first color original image including image data of only a monochromatic color channel and the second color original image including image data of both monochromatic color channel and the panchromatic color channel, and fuses the first color original image and the second color original image to improve the signal-to-noise ratio and the clarity of the image by using the image data of the panchromatic color channel, so that the quality of the image taken in the dark environment can be improved.

Referring to FIGS. 1, 2, 5 and 25, the disclosure further provides an image acquisition method that may be applied to the image sensor 10 described in any one of the above embodiments. The image acquisition method includes operations as follows.

At 01: exposing a pixel array 11 to acquire a first color original image and a second color original image, where the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel and the at least one color photosensitive pixel of the sub-unit.

At 02: performing, for each of multiple color channels, an interpolation on the first color original image to acquire a first interpolated image of the color channel, and performing interpolation on the second color original image to acquire a second interpolated image of at least one color channel.

At 03: fusing the second interpolated image of the at least one color channel with the first interpolated images of the multiple color channels to obtain fused images of the multiple color channels.

At 04: acquiring a target image based on the fused images of the multiple color channels.

In the above embodiments, the acquisition method further includes:
filtering, for each of the multiple color channels, the first interpolated image of the color channel to obtain a first filtered image of the color channel; and
filtering the second interpolated image of the at least one color channel to obtain a second filtered image of the at least one color channel.

The operation 04 of acquiring the target image based on the fused images of the multiple color channels includes:
fusing the second filtered image of the at least one color channel with the first filtered images of the multiple color channels to obtain the fused images of the multiple color channels.

Referring to FIG. 18, in some embodiments, the operation of filtering, for each of the multiple color channels, the first interpolated image of the color channel to obtain a first filtered image of the color channel, includes:
determining a first to-be-filtered pixel and a first to-be-filtered area in the first interpolated image, in which the first to-be-filtered pixel is located in the first to-be-filtered area;
determining a first reference pixel and a first reference area in the second interpolated image, in which the first reference pixel corresponds to the first to-be-filtered pixel, and the first reference area corresponds to the first to-be-filtered area;
calculating, for each of a plurality of first pixels in the first reference area, a weight for the first pixel relative to the first reference pixel, and the weight comprises a weight in a spatial domain and a weight in a range domain;
correcting, according to the weights of the multiple first pixels and pixel values of pixels corresponding to the first to-be-filtered area, a pixel value of the first to-be-filtered pixel to obtain one of the multiple pieces of first filtered image data; and
traversing each pixel in the first interpolated image to obtain the multiple pieces of first filtered image data.

In some embodiments, the operation of filtering the second interpolated image of the at least one color channel to obtain a second filtered image of the at least one color channel, includes:
determining a second to-be-filtered pixel in the second interpolated image;
determining a second to-be-filtered area in the second interpolated image, where the second to-be-filtered pixel is located in the second to-be-filtered area;
calculating, for each of a plurality of second pixels in the second to-be-filtered area, a weight for the second pixel relative to the second to-be-filtered pixel, and the weight comprises a weight in a spatial domain and a weight in a range domain
correcting, according to pixel values of the multiple second pixels and the weights of the multiple second pixels, a pixel value of the second to-be-filtered pixel to obtain one of the plurality pieces of second filtered image data; and
traversing each pixel in the second interpolated image to obtain the multiple pieces of second filtered image data.

In some embodiments, the operation of fusing the second filtered image of the at least one color channel with the first filtered image of the multiple color channel to obtain the fused images of the color channels, includes:
performing, according to one of the multiple pieces of first filtered image data, one of the multiple pieces of second filtered image data and one of the multiple pieces of interpolated image data, a calculation to acquire one of the multiple pieces of fused image data, in which the fused image data is positively correlated with the first filtered image data, the fused image data is negatively correlated with the second filtered image data, and the fused image data is positively correlated with the interpolated image data; and
traversing each pixel in the first filtered image to acquire the multiple pieces of fused image data.

In some embodiments, the operation of fusing the second filtered image of the at least one color channel with the first filtered images of the multiple color channels to obtain the fused images of the multiple color channels, further includes:
in response to the first filtered image data being greater than a preset value, determining the first filtered image data as the fused image data;
in response to the first filtered image data being less than or equal to the preset pixel value, performing, according to the first filtered image data, the second filtered image data and the interpolated image data, a calculation to acquire the fused image data, in which the fused image data is positively correlated with the first filtered image data, the fused image data is negatively correlated with the second filtered image data, and the fused image data is positively correlated with the interpolated image data.

In some embodiments, when the second interpolated image of the at least one color channel is the second interpolated image of one of the multiple color channels, the operation of filtering the second interpolated image of the at least one color channel to obtain a second filtered image of the at least one color channel includes: filtering the second interpolated image of the one color channel to obtain the second filtered image of the one color channel. The operation of fusing the second interpolated image of the at least one color channel with the first interpolated images of the multiple color channels to obtain fused images of the multiple color channels, includes: performing, for each of the plurality of color channels, a calculation based on the second interpolated image of the one color channel, the second filtered image of the one color channel and the first filtered image of the color channel to obtain the fused image of the color channel. In at least one alternative embodiments, the second interpolated image of the one of the multiple color channels is the second interpolated image of a green channel.

In some embodiments, when the second interpolated image of the at least one color channel is the second interpolated images of the multiple color channels, the operation of filtering the second interpolated image of the at least one color channel to obtain a second filtered image of the at least one color channel includes: filtering, for each of the multiple color channels, the second interpolated images of the color channel to obtain the second filtered images of the color channel. The operation of fusing the second interpolated image of the at least one color channel with the first interpolated images of the multiple color channels to obtain fused images of the multiple color channels, includes: performing, for each of the multiple color channels, a calculation based on the second interpolated image of the color channel, the second filtered image of the color channel and the first filtered image of the color channel to obtain the fused image of the color channel.

Referring to FIG. 13, in some embodiments, when each of the multiple the sub-unit includes multiple the color photosensitive pixels, a sum or an average of multiple electrical signals generated by the multiple color photosensitive pixels after receiving light are taken as a piece of the first color original image data;

Referring to FIG. 14, in some embodiments, when each sub-unit includes one the transparent photosensitive pixel W, a sum or an average of an electrical signal generated by the transparent photosensitive pixel W after receiving light and all electrical signal generated by all the color photosensitive pixel in the sub-unit after receiving light is taken as a piece of the second color original image data.

Referring to FIG. 5, when each sub-unit includes multiple the transparent photosensitive pixels, a sum or average of multiple electrical signals generated by the multiple transparent photosensitive pixels after receiving light and all electrical signal generated by all the color photosensitive pixel in the sub-unit is taken as a piece of the second color original image data.

According to the embodiments of the disclosure, the image acquisition method, the camera assembly and the terminal device are provided. The pixel array is exposed to acquire the first color original image including image data of only a color channel and the second color original image including image data of both the color channel and full-color channel, and the first color original image and the second color original image are interpolated and fused to improve the signal-to-noise ratio and the definition of the image with the image data of the panchromatic color channel, i.e., a transparent color channel, so that the quality of the image taken in a dark environment can be improved.

The specific implementation process of the image acquisition method described in any one of the above embodiments is the same as that described above for acquiring the first color original image and the second color original image of the camera assembly 100 (shown in FIG. 1) and interpolating the first color original image and the second color original image to obtain the first interpolated image of each color channel and the second interpolated image of at least one color channel, fusing the second interpolated image with the first interpolated image of each color channel to obtain the fused image of each color channel, and obtaining the target image based on the fused image of each color channel. Details will not be described here.

In the description of the specification, the terms "one embodiment", "some embodiments", "an exemplary embodiment", "an example", "a specific example", or "some examples" or the like mean that specific features, structures, materials or characteristics described in combination with the embodiment or example are included in at least one embodiment or example of the disclosure. In the specification, demonstrative expressions of the terms may not refer to the same embodiment or example. Moreover, the specific features, structures, materials or characteristics as described may be combined in a suitable manner in any one or more embodiments or examples. In addition, without contradicting each other, those skilled in the art may combine the different embodiments or examples described in this specification and the features of the different embodiments or examples.

Any process or method described in the flowchart or otherwise described herein may be understood to represent a module, fragment or portion of code comprising one or more executable instructions for implementing steps of a particular logical function or process, and the scope of the preferred embodiments of the present disclosure includes additional implementations in which the functions may be performed not in the order shown or discussed, including in a substantially simultaneous manner or in the reverse order, depending on the function involved, as should be understood by those skilled in the art to which the embodiments of the present disclosure belong.

Although the embodiments of the disclosure have been shown and described in the above, it should be understood that the above embodiments are exemplary and should not be construed as limiting the disclosure. Changes, modifications, substitutions and alterations can be made to the above embodiments within the scope of the disclosure by those skilled in the art.

What is claimed is:

1. An image acquisition method, performed by an image sensor, wherein the image sensor comprises a pixel array including a plurality of sub-units, each of the plurality of sub-units comprises at least one transparent photosensitive pixel and at least one color photosensitive pixel, and the color photosensitive pixel has a narrower spectral response range than the transparent photosensitive pixel; wherein the image acquisition method comprises:

acquiring a first color original image and a second color original image by exposing the pixel array, wherein the first color original image is composed of a plurality pieces of first color original image data, each of the plurality pieces of first color original image data is generated by the at least one color photosensitive pixel of the sub-unit, the second color original image is composed of a plurality pieces of second color original image data, and each of the plurality pieces of second color original image data is generated by the at least one transparent photosensitive pixel and the at least one color photosensitive pixel of the sub-unit;

performing, for each of a plurality of color channels, interpolation on the first color original image to acquire a first interpolated image of the color channel, and performing interpolation on the second color original image to acquire a second interpolated image of at least one color channel;

fusing the second interpolated image of the at least one color channel with the first interpolated images of the plurality of color channels to obtain fused images of the plurality of color channels; and acquiring a target image based on the fused images of the plurality of color channels.

2. The image acquisition method as claimed in claim 1, further comprising:

filtering, for each of the plurality of color channels, the first interpolated image of the color channel to obtain a first filtered image of the color channel; and filtering the second interpolated image of the at least one color channel to obtain a second filtered image of the at least one color channel; and wherein the fusing the second interpolated image of the at least one color channel with the first interpolated images of the plurality of color channels to obtain fused images of the plurality of color channels, comprises:

fusing the second filtered image of the at least one color channel with the first filtered images of the plurality of color channels to obtain the fused images of the plurality of color channels.

3. The image acquisition method as claimed in claim 2, wherein the first filtered image is composed of a plurality pieces of first filtered image data, and the filtering, for each of the plurality of color channels, the first interpolated image of the color channel to obtain a first filtered image of the color channel, comprises:

determining a first to-be-filtered pixel and a first to-be-filtered area in the first interpolated image, wherein the first to-be-filtered pixel is located in the first to-be-filtered area;

determining a first reference pixel and a first reference area in the second interpolated image, wherein the first reference pixel corresponds to the first to-be-filtered pixel, and the first reference area corresponds to the first to-be-filtered area;

calculating, for each of a plurality of first pixels in the first reference area, a weight for the first pixel relative to the first reference pixel, and the weight comprises a weight in a spatial domain and a weight in a range domain;

correcting, according to the weights of the plurality of first pixels and pixel values of pixels corresponding to the first to-be-filtered area, a pixel value of the first to-be-filtered pixel to obtain one of the plurality pieces of first filtered image data; and traversing each pixel in the first interpolated image to obtain the plurality pieces of first filtered image data.

4. The image acquisition method as claimed in claim 2, wherein the second filtered image is composed of a plurality pieces of second filtered image data, and the filtering the second interpolated image of the at least one color channel to obtain a second filtered image of the at least one color channel, comprises:

determining a second to-be-filtered pixel in the second interpolated image;

determining a second to-be-filtered area in the second interpolated image, wherein the second to-be-filtered pixel is located in the second to-be-filtered area;

calculating, for each of a plurality of second pixels in the second to-be-filtered area, a weight for the second pixel relative to the second to-be-filtered pixel, and the weight comprises a weight in a spatial domain and a weight in a range domain;

correcting, according to pixel values of the plurality of second pixels and the weights of the plurality of second pixels, a pixel value of the second to-be-filtered pixel to obtain one of the plurality pieces of second filtered image data; and traversing each pixel in the second interpolated image to obtain the plurality pieces of second filtered image data.

5. The image acquisition method as claimed in claim 2, wherein the first filtered image is composed of a plurality pieces of first filtered image data, the second filtered image is composed of a plurality pieces of second filtered image data, the second interpolated image is composed of a plurality pieces of interpolated image data, and the fused image is composed of a plurality pieces of fused image data, and the fusing the second filtered image of the at least one color channel with the first filtered images of the plurality of color channels to obtain fused images of the plurality of color channels, comprises:

performing, according to one of the plurality pieces of first filtered image data, one of the plurality pieces of second filtered image data and one of the plurality pieces of interpolated image data, a calculation to acquire one of the plurality pieces of fused image data, wherein the fused image data is positively correlated with the first filtered image data, the fused image data is negatively correlated with the second filtered image data, and the fused image data is positively correlated with the interpolated image data; and traversing each pixel in the first filtered image to acquire the plurality pieces of fused image data.

6. The image acquisition method as claimed in claim 5, wherein the method further comprising:

in response to the one of the plurality pieces of first filtered image data being greater than a preset pixel value, determining the one of the plurality pieces of first filtered image data as the one of the plurality pieces of fused image data;

in response to the one of the plurality pieces of first filtered image data being less than or equal to the preset pixel value, performing, according to the one of the plurality pieces of first filtered image data, the one of the plurality pieces of second filtered image data and the one of the plurality pieces of interpolated image data, the calculation to acquire the one of the plurality pieces of fused image data.

7. The image acquisition method as claimed in claim 2, wherein the second interpolated image of the at least one color channel is the second interpolated image of one of the plurality of color channels; and the filtering the second interpolated image of the at least one color channel to obtain a second filtered image of the at least one color channel, comprises:

filtering the second interpolated image of the one color channel to obtain the second filtered image of the one color channel.

8. The image acquisition method as claimed in claim 7, wherein the fusing the second filtered image of the at least one color channel with the first filtered images of the plurality of color channels to obtain the fused images of the plurality of color channels, comprises:

performing, for each of the plurality of color channels, a calculation based on the second interpolated image of the one color channel, the second filtered image of the one color channel and the first filtered image of the color channel to obtain the fused image of the color channel.

9. The image acquisition method as claimed in claim 8, wherein the second interpolated image of the one of the plurality of color channels is the second interpolated image of a green channel.

10. The image acquisition method as claimed in claim 2, wherein the second interpolated image of the at least one color channel is the second interpolated images of the plurality of color channels; and the filtering the second interpolated image of the at least one color channel to obtain a second filtered image of the at least one color channel, comprises:

filtering the second interpolated images of the plurality of color channels to obtain the second filtered images of the plurality of color channels; and wherein the fusing the second filtered image of the at least one color channel with the first filtered images of the plurality of color channels to obtain the fused images of the plurality of color channels, comprises:

performing, for each of the plurality of color channels, a calculation based on the second interpolated image of the color channel, the second filtered image of the color channel and the first filtered image of the color channel to obtain the fused image of the color channel.

11. The image acquisition method as claimed in claim 1, wherein when each of the plurality of sub-units comprises one the color photosensitive pixel, an electrical signal generated by the color photosensitive pixel after receiving light is taken as a piece of the first color original image data;

when each of the plurality of sub-units comprises a plurality of the color photosensitive pixels, a sum or an average of a plurality of electrical signals generated by the plurality of color photosensitive pixels after receiving light are taken as a piece of the first color original image data;

when each of the plurality of sub-units comprises one the transparent photosensitive pixel, a sum or an average of an electrical signal generated by the transparent photosensitive pixel after receiving light and all electrical signal generated by the at least one color photosensitive pixel in the sub-unit after receiving light is taken as of the plurality pieces of second color original image data;

when each of the plurality of sub-units comprises a plurality of the transparent photosensitive pixels, a sum or average of a plurality of electrical signals generated by the plurality of transparent photosensitive pixels after receiving light and all electrical signal generated by the at least one color photosensitive pixel in the sub-unit is taken as of the plurality pieces of second color original image data.

12. A camera assembly, comprising:
an image sensor, wherein the image sensor comprises a pixel array including a plurality of sub-units, each of the plurality of sub-units comprises at least one transparent photosensitive pixel and at least one color photosensitive pixel, and the at least one color photosensitive pixel has a narrower spectral response range than the transparent photosensitive pixel; wherein a first color original image and a second color original image are acquired by exposing the pixel array, the first color original image is composed of a plurality pieces of first color original image data, each of the plurality pieces of first color original image data is generated by the at least one color photosensitive pixel of the sub-unit, the second color original image is composed of a plurality pieces of second color original image data, and each of the plurality pieces of second color original image data is generated by the at least one transparent photosensitive pixel and the at least one color photosensitive pixel of the sub-unit; and
a processor, wherein the processor is configured to perform, for each of a plurality of color channels, interpolation on the first color original image to acquire a first interpolated image of the color channel, and perform interpolation on the second color original image to acquire a second interpolated image of at least one color channel; fuse, for each of the plurality of color channels, the second interpolated image with the first interpolated image of the color channel to obtain a fused image of the color channel; and acquire a target image based on the fused images of the plurality of color channels.

13. The camera assembly as claimed in claim 12, the processor being further configured to:
filter, for each of the plurality of color channels, the first interpolated image of the color channel to obtain a first filtered image of the color channel;
filter the second interpolated image of the at least one color channel to obtain a second filtered image of the at least one color channel; and
fuse the second filtered image of the at least one color channel with the first filtered images of the plurality of color channels to obtain the fused images of the plurality of color channels.

14. The camera assembly as claimed in claim 13, the processor being further configured to:
determine a first to-be-filtered pixel and a first to-be-filtered area in the first interpolated image, wherein the first to-be-filtered pixel is located in the first to-be-filtered area;
determine a first reference pixel and a first reference area in the second interpolated image, wherein the first reference pixel corresponds to the first to-be-filtered pixel, and the first reference area corresponds to the first to-be-filtered area;
calculate, for each of a plurality of first pixels in the first reference area, a weight for the first pixel relative to the first reference pixel, and the weight comprises a weight in a spatial domain and a weight in a range domain;
correct, according to the weights of the plurality of first pixels and pixel values of pixels corresponding to the first to-be-filtered area, a pixel value of the first to-be-filtered pixel to obtain first filtered image data; and
traverse each pixel in the first interpolated image to obtain a plurality pieces of the first filtered image data.

15. The camera assembly as claimed in claim 13, the processor being further configured to:
determine a second to-be-filtered pixel in the second interpolated image;
determine a second to-be-filtered area in the second interpolated image, wherein the second to-be-filtered pixel is located in the second to-be-filtered area;
calculate, for each of a plurality of second pixels in the second to-be-filtered area, a weight for the second pixel relative to the second to-be-filtered pixel, and the weight comprises a weight in a spatial domain and a weight in a range domain;
correct, according to pixel values of the plurality of second pixels and the weights of the plurality of second pixels, a pixel value of the second to-be-filtered pixel to obtain second filtered image data; and
traverse each pixel in the second interpolated image to obtain a plurality pieces of the second filtered image data.

16. The camera assembly as claimed in claim 13, the processor being further configured to:
perform, according to first filtered image data of the first filtered image, second filtered image data of the second filtered image and interpolated image data of the second interpolated image, a calculation to acquire fused image data, wherein the fused image data is positively correlated with the first filtered image data, the fused image data is negatively correlated with the second filtered image data, and the fused image data is positively correlated with the interpolated image data; and
traverse each pixel in the first filtered image to acquire a plurality pieces of the fused image data, wherein the plurality pieces of the fused image data compose the fused image of the color channel.

17. The camera assembly as claimed in claim 12, wherein when each of the plurality of sub-units comprises one the color photosensitive pixel, an electrical signal generated by the color photosensitive pixel after receiving light is taken as a piece of the first color original image data;

when each of the plurality of sub-units comprises a plurality of the color photosensitive pixels, a sum or an average of a plurality of electrical signals generated by the plurality of color photosensitive pixels after receiving light are taken as a piece of the first color original image data;

when each of the plurality of sub-units comprises one the transparent photosensitive pixel, a sum or an average of an electrical signal generated by the transparent photosensitive pixel after receiving light and all electrical signal generated by all the color photosensitive pixel in the sub-unit after receiving light is taken as one of the plurality pieces of second color original image data;

when each of the plurality of sub-units comprises a plurality of the transparent photosensitive pixels, a sum or average of a plurality of electrical signals generated by the plurality of transparent photosensitive pixels after receiving light and all electrical signal generated by all the color photosensitive pixel in the sub-unit is taken as one of the plurality pieces of second color original image data.

18. The camera assembly as claimed in claim 12, wherein in each of the plurality of sub-units, the transparent photosensitive pixel and the color photosensitive pixel are arranged alternately; or in each of the plurality of sub-units, a plurality of photosensitive pixels in a same row have a same color channel; or in each of the plurality of sub-units, a plurality of photosensitive pixels in a same column have a same color channel.

19. A mobile terminal, comprising:

a housing; and a camera assembly combined with the housing;

wherein the camera assembly comprises:

an image sensor, wherein the image sensor comprises a pixel array including a plurality of sub-units, each of the plurality of sub-units comprises at least one transparent photosensitive pixel and at least one color photosensitive pixel, and the color photosensitive pixel has a narrower spectral response range than the transparent photosensitive pixel; wherein a first color original image and a second color original image are acquired by exposing the pixel array, wherein the first color original image is composed of a plurality pieces of first color original image data, each of the plurality pieces of first color original image data is generated by the at least one color photosensitive pixel of the sub-unit, the second color original image is composed of a plurality pieces of second color original image data, and each of the plurality pieces of second color original image data is generated by the at least one transparent photosensitive pixel and the at least one color photosensitive pixel of the sub-unit; and a processor, wherein the processor is configured to perform interpolation on the first color original image to acquire first interpolated images of a plurality of color channels, and perform interpolation on the second color original image to acquire at least one second interpolated image of the plurality of color channels; fuse the at least one second interpolated image with the first interpolated images of the plurality of color channels to obtain fused images of the plurality of color channels; and acquire a target image based on the fused images of the plurality of color channels.

20. The mobile terminal as claimed in claim 19, the processor being further configured to:

filter, for each of the plurality of color channels, the first interpolated image of the color channel to obtain a first filtered image of the color channel, wherein the first filtered image of the color channel comprises a plurality pieces of first filtered image data;

filter the at least one second interpolated image to obtain at least one second filtered image, wherein the second interpolated image comprises a plurality pieces of interpolated image data, and the second filtered image comprises a plurality pieces of second filtered image data; and perform, for each of the plurality of color channels, a calculation based on one of the plurality pieces of first filtered image data, one of the plurality pieces of interpolated image data, and one of the plurality pieces of second filtered image data to acquire a piece of fused image data, wherein the piece of fused image data is positively correlated with the first filtered image data, the fused image data is negatively correlated with the second filtered image data, and the fused image data is positively correlated with the interpolated image data; and traverse each pixel in the first filtered image to acquire a plurality pieces of the fused image data, wherein the plurality pieces of the fused image data compose the fused image of the color channel.

* * * * *